US012587629B2

(12) United States Patent
Lee et al.

(10) Patent No.: US 12,587,629 B2
(45) Date of Patent: *Mar. 24, 2026

(54) AUGMENTED SUPERSTEREOSCOPIC DISPLAY

(71) Applicant: Looking Glass Factory, Inc., Brooklyn, NY (US)

(72) Inventors: Shiu Pong Lee, Brooklyn, NY (US); Oliver Garcia-Borg, Brooklyn, NY (US); Shouvick Koley, Brooklyn, NY (US); Alexander Duncan, Brooklyn, NY (US); Robert Kodadek, Brooklyn, NY (US); Shawn Michael Frayne, Brooklyn, NY (US)

(73) Assignee: Looking Glass Factory, Inc., Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/822,032

(22) Filed: Aug. 30, 2024

(65) Prior Publication Data

US 2025/0080713 A1     Mar. 6, 2025

Related U.S. Application Data

(60) Provisional application No. 63/579,751, filed on Aug. 30, 2023.

(51) Int. Cl.
H04N 13/361     (2018.01)
G02B 30/27     (2020.01)
(Continued)

(52) U.S. Cl.
CPC ........... H04N 13/361 (2018.05); G02B 30/27 (2020.01); H04N 13/106 (2018.05); H04N 13/305 (2018.05); H04N 13/398 (2018.05)

(58) Field of Classification Search
CPC .. H04N 13/361; H04N 13/106; H04N 13/305; H04N 13/398; G02B 30/27
(Continued)

(56) References Cited

U.S. PATENT DOCUMENTS 4,140,370 A     2/1979  Snaper et al.
4,340,275 A     7/1982  Henkes
(Continued)

FOREIGN PATENT DOCUMENTS

CN     103852819 A     6/2014
CN     106125322 A     11/2016
(Continued)

OTHER PUBLICATIONS

Janusz, Konrad and Michael Halle, Nov. 2007, 3-D Displays and Signal Processing, IEEE (Year: 2007).*
(Continued)

*Primary Examiner* — William C Vaughn, Jr.
(74) *Attorney, Agent, or Firm* — Jeffrey Schox; Randy Mehlenbacher

(57)     ABSTRACT
A device can include a first light source that generates a first light output, a parallax generator that receives the first light output and transmits separate portions of the first light output into distinct directions, and a second light source that generates a second light output, wherein the separate portions of the first light output are transmitted through the second light source.

23 Claims, 8 Drawing Sheets

Boundary of 3D canvas

(51) Int. Cl.
    *H04N 13/106*     (2018.01)
    *H04N 13/305*     (2018.01)
    *H04N 13/398*     (2018.01)

(58) Field of Classification Search
    USPC ........................................................ 348/54
    See application file for complete search history.

(56)             References Cited

U.S. PATENT DOCUMENTS

| | | | |
|---|---|---|---|
| 4,561,731 A | 12/1985 | Kley | |
| 4,767,186 A | 8/1988 | Bradley et al. | |
| 4,964,695 A | 10/1990 | Bradley et al. | |
| 5,233,373 A | 8/1993 | Peters et al. | |
| 5,359,454 A | 10/1994 | Steenblik et al. | |
| 5,396,303 A | 3/1995 | Peters et al. | |
| 5,420,689 A | 5/1995 | Siu | |
| 5,481,385 A | 1/1996 | Zimmerman et al. | |
| 5,519,533 A | 5/1996 | Nomura et al. | |
| 5,521,724 A | 5/1996 | Shires | |
| 5,521,726 A | 5/1996 | Zimmerman et al. | |
| 5,548,427 A | 8/1996 | May | |
| 5,745,199 A | 4/1998 | Suzuki et al. | |
| 5,852,512 A | 12/1998 | Chikazawa | |
| 5,871,266 A | 2/1999 | Negishi et al. | |
| 5,886,675 A | 3/1999 | Aye et al. | |
| 6,002,518 A | 12/1999 | Faris | |
| 6,064,424 A | 5/2000 | Van et al. | |
| 6,097,394 A | 8/2000 | Levoy et al. | |
| 6,195,184 B1 | 2/2001 | Chao et al. | |
| 6,398,370 B1 | 6/2002 | Chiu et al. | |
| 6,462,871 B1 | 10/2002 | Morishima | |
| 6,649,925 B2 | 11/2003 | Talmi | |
| 6,771,419 B1 | 8/2004 | Yamagishi et al. | |
| 6,798,390 B1 | 9/2004 | Sudo et al. | |
| 6,888,612 B2 | 5/2005 | Faris | |
| 6,927,769 B2 | 8/2005 | Roche | |
| 6,950,493 B2 | 9/2005 | Besson | |
| 7,006,125 B2 | 2/2006 | Divelbiss et al. | |
| 7,180,554 B2 | 2/2007 | Divelbiss et al. | |
| 7,215,357 B1 | 5/2007 | Swift et al. | |
| 7,355,658 B2 | 4/2008 | Ioki et al. | |
| 7,432,901 B2 | 10/2008 | Baek et al. | |
| 7,432,996 B2 | 10/2008 | Ioki et al. | |
| 7,489,311 B2 | 2/2009 | Lee | |
| 7,545,466 B2 | 6/2009 | Lee | |
| 7,580,085 B2 | 8/2009 | Jacobs et al. | |
| 7,612,833 B2 | 11/2009 | Kim | |
| 7,623,111 B2 | 11/2009 | Ioki et al. | |
| 7,697,750 B2 | 4/2010 | Simmons | |
| 7,714,946 B2 | 5/2010 | Hong et al. | |
| 7,753,529 B2 | 7/2010 | Fukaishi et al. | |
| 7,804,549 B2 | 9/2010 | Ioki et al. | |
| 7,808,564 B2 | 10/2010 | Tamura et al. | |
| 7,855,756 B2 | 12/2010 | Hong et al. | |
| 7,876,350 B2 | 1/2011 | Shin et al. | |
| 7,876,489 B2 | 1/2011 | Gandhi et al. | |
| 8,213,082 B2 | 7/2012 | Gaides et al. | |
| 8,248,694 B2 | 8/2012 | Sugiyama | |
| 8,416,276 B2 | 4/2013 | Kroll et al. | |
| 8,581,966 B2 | 11/2013 | Chen et al. | |
| 8,605,256 B2 | 12/2013 | Devoe et al. | |
| 9,063,284 B2 | 6/2015 | Jones et al. | |
| 9,229,253 B2 | 1/2016 | Schwartz et al. | |
| 9,335,449 B2 | 5/2016 | Gaides et al. | |
| 9,407,907 B2 | 8/2016 | Gaudreau | |
| 9,479,767 B2 | 10/2016 | Van Der Horst | |
| 9,486,386 B2 | 11/2016 | Bathiche et al. | |
| 9,584,797 B2 | 2/2017 | Hyde et al. | |
| 9,654,768 B2 | 5/2017 | Qin et al. | |
| 9,686,535 B2 | 6/2017 | Hamagishi et al. | |
| 9,704,220 B1 | 7/2017 | Bakar et al. | |
| 9,791,709 B1 | 10/2017 | Ouderkirk et al. | |
| 10,012,841 B1 | 7/2018 | Frayne et al. | |
| 10,152,154 B2 | 12/2018 | Chen | |
| 10,551,913 B2 | 2/2020 | Mccombe et al. | |
| 10,853,625 B2 | 12/2020 | Mccombe et al. | |
| 10,904,479 B2 | 1/2021 | Karafin et al. | |
| 10,924,817 B2 | 2/2021 | Defaria et al. | |
| 10,948,648 B2 | 3/2021 | Ihas et al. | |
| 11,415,728 B2 | 8/2022 | Hornstein et al. | |
| 11,675,426 B2 * | 6/2023 | Futterer | G06F 3/01 |
| 2002/0080484 A1 | 6/2002 | Moshrefzadeh et al. | |
| 2004/0165262 A1 | 8/2004 | Alejo | |
| 2004/0169928 A1 | 9/2004 | Nilsen et al. | |
| 2004/0240777 A1 | 12/2004 | Woodgate et al. | |
| 2005/0078370 A1 | 4/2005 | Nishihara et al. | |
| 2005/0117016 A1 | 6/2005 | Surman | |
| 2005/0168815 A1 | 8/2005 | Maruyama et al. | |
| 2005/0168816 A1 | 8/2005 | Fukaishi et al. | |
| 2005/0243428 A1 | 11/2005 | Takahashi et al. | |
| 2006/0146404 A1 | 7/2006 | Ioki et al. | |
| 2006/0191177 A1 | 8/2006 | Engel | |
| 2006/0192746 A1 | 8/2006 | Ioki et al. | |
| 2006/0203084 A1 | 9/2006 | Okazaki et al. | |
| 2006/0221444 A1 | 10/2006 | Fukaishi et al. | |
| 2006/0244918 A1 | 11/2006 | Cossairt et al. | |
| 2007/0091436 A1 | 4/2007 | Aoki et al. | |
| 2007/0160811 A1 | 7/2007 | Gaides et al. | |
| 2007/0164950 A1 | 7/2007 | Tajiri | |
| 2007/0165145 A1 | 7/2007 | Sugiyama | |
| 2007/0171523 A1 | 7/2007 | Yoon | |
| 2007/0222954 A1 | 9/2007 | Hattori | |
| 2008/0186558 A1 | 8/2008 | Lee et al. | |
| 2008/0239483 A1 | 10/2008 | Kuroda et al. | |
| 2008/0239485 A1 | 10/2008 | Kuroda et al. | |
| 2008/0297592 A1 | 12/2008 | Oyamada et al. | |
| 2008/0297897 A1 | 12/2008 | Oyamada et al. | |
| 2008/0297908 A1 | 12/2008 | Adachi et al. | |
| 2008/0304151 A1 | 12/2008 | Ura | |
| 2009/0067057 A1 | 3/2009 | Sprague et al. | |
| 2009/0073087 A1 | 3/2009 | Janson et al. | |
| 2009/0141122 A1 | 6/2009 | Hong | |
| 2009/0146915 A1 | 6/2009 | Marathe | |
| 2009/0190213 A1 | 7/2009 | Tamura et al. | |
| 2009/0213593 A1 | 8/2009 | Foley et al. | |
| 2010/0007716 A1 | 1/2010 | Lee et al. | |
| 2010/0079584 A1 * | 4/2010 | Sung et al. | H04N 13/04 348/52 |
| 2010/0103485 A1 * | 4/2010 | Haussler | G03H 1/08 359/9 |
| 2010/0201242 A1 | 8/2010 | Liu et al. | |
| 2010/0265230 A1 | 10/2010 | Kang | |
| 2010/0271721 A1 | 10/2010 | Gaides et al. | |
| 2011/0025833 A1 | 2/2011 | Baik et al. | |
| 2011/0063424 A1 | 3/2011 | Matsuhiro et al. | |
| 2011/0157339 A1 * | 6/2011 | Bennett et al. | H04N 13/04 348/59 |
| 2011/0193863 A1 | 8/2011 | Gremse et al. | |
| 2011/0316987 A1 | 12/2011 | Komoriya et al. | |
| 2012/0002123 A1 | 1/2012 | Kang | |
| 2012/0026583 A1 | 2/2012 | Kuwayama et al. | |
| 2012/0139897 A1 | 6/2012 | Butler et al. | |
| 2012/0313896 A1 | 12/2012 | Noda | |
| 2013/0082905 A1 * | 4/2013 | Ranieri et al. | H04N 13/0409 345/32 |
| 2013/0088486 A1 | 4/2013 | Yoon et al. | |
| 2013/0201573 A1 | 8/2013 | Shiota | |
| 2013/0307948 A1 | 11/2013 | Odake et al. | |
| 2014/0118511 A1 | 5/2014 | Hyde et al. | |
| 2014/0140094 A1 * | 5/2014 | Miyao | G02B 6/0013 |
| 2014/0204464 A1 | 7/2014 | Halverson et al. | |
| 2014/0267584 A1 | 9/2014 | Atzpadin et al. | |
| 2014/0320614 A1 | 10/2014 | Gaudreau | |
| 2014/0327188 A1 | 11/2014 | Naganuma et al. | |
| 2014/0347454 A1 | 11/2014 | Qin et al. | |
| 2015/0022887 A1 | 1/2015 | Larson et al. | |
| 2016/0021365 A1 | 1/2016 | Effendi et al. | |
| 2016/0101013 A1 | 4/2016 | Bathiche et al. | |
| 2016/0234487 A1 | 8/2016 | Kroon et al. | |
| 2016/0253795 A1 * | 9/2016 | Cole et al. | G06T 7/002 |
| 2016/0313842 A1 | 10/2016 | Pacheco et al. | |
| 2017/0041596 A1 | 2/2017 | Park et al. | |
| 2017/0078650 A1 | 3/2017 | Frayne et al. | |
| 2017/0108628 A1 | 4/2017 | Larsen et al. | |

(56) References Cited

U.S. PATENT DOCUMENTS

| | | | |
|---|---|---|---|
| 2017/0139213 | A1 | 5/2017 | Schmidtlin |
| 2017/0208292 | A1 | 7/2017 | Smits |
| 2017/0347083 | A1 | 11/2017 | Grossmann |
| 2018/0035096 | A1 | 2/2018 | Gemayel |
| 2018/0084245 | A1 | 3/2018 | Lapstun |
| 2018/0188550 | A1 | 7/2018 | Frayne et al. |
| 2018/0196275 | A1* | 7/2018 | Robinson et al. ..... G02B 27/26 |
| 2019/0035125 | A1 | 1/2019 | Bellows et al. |
| 2019/0049899 | A1 | 2/2019 | Gelman et al. |
| 2019/0088004 | A1 | 3/2019 | Lucas et al. |
| 2019/0146234 | A1 | 5/2019 | Yoshida |
| 2019/0149808 | A1 | 5/2019 | Ng et al. |
| 2019/0196539 | A1 | 6/2019 | Cassar |
| 2019/0268588 | A1 | 8/2019 | Frayne et al. |
| 2019/0346615 | A1 | 11/2019 | Johnson et al. |
| 2020/0225402 | A1 | 7/2020 | Ihas et al. |
| 2020/0228881 | A1 | 7/2020 | Defaria et al. |
| 2020/0266252 | A1 | 8/2020 | Cancel Olmo et al. |
| 2020/0296327 | A1 | 9/2020 | Karafin et al. |
| 2020/0314415 | A1 | 10/2020 | Karafin et al. |
| 2020/0384371 | A1 | 12/2020 | Karafin et al. |
| 2021/0044795 | A1 | 2/2021 | Karafin et al. |
| 2021/0060405 | A1 | 3/2021 | Karafin et al. |
| 2021/0132693 | A1 | 5/2021 | Pulli et al. |
| 2021/0165212 | A1 | 6/2021 | Christmas |
| 2021/0166411 | A1* | 6/2021 | Akdemir et al. ....... G06T 7/593 |
| 2021/0218931 | A1 | 7/2021 | Karafin et al. |
| 2021/0373205 | A1* | 12/2021 | Hornstein et al. ....... G02B 5/00 |
| 2022/0028432 | A1* | 1/2022 | Richards ................ G02B 27/01 |
| 2022/0051481 | A1* | 2/2022 | Laine et al. .......... G06T 17/205 |
| 2022/0283432 | A1 | 9/2022 | Richards |
| 2022/0337806 | A1* | 10/2022 | Kahn et al. .......... H04N 13/395 |
| 2023/0028958 | A1 | 1/2023 | Liu et al. |

FOREIGN PATENT DOCUMENTS

| | | |
|---|---|---|
| EP | 0294122 A1 | 12/1988 |
| EP | 1965245 A1 | 9/2008 |
| JP | 2006330018 A | 12/2006 |
| JP | 2010068202 A | 3/2010 |
| KR | 20090061232 A | 6/2009 |
| KR | 20140111553 A | 9/2014 |
| WO | 9500872 A1 | 1/1995 |
| WO | 9854548 A1 | 12/1998 |
| WO | 0197531 A2 | 12/2001 |
| WO | 02076107 A1 | 9/2002 |
| WO | 2004066203 A2 | 8/2004 |
| WO | 2004111913 A2 | 12/2004 |
| WO | 2006015562 A1 | 2/2006 |
| WO | 2008091407 A2 | 7/2008 |
| WO | 2010067506 A1 | 6/2010 |
| WO | 2015104239 A2 | 7/2015 |
| WO | 2018227098 A1 | 12/2018 |

OTHER PUBLICATIONS

Ziegler et al., Mar. 2007, A framework for Holgraphic Scene Representation and Image Synthesis (Year: 2007).*

Wook-Joong et al., Jun. 2008, Disparity Adaptive Filter for Anti-Aliasing of Stereoscopic #D Images (Year: 2008).*

Urey et al., Apr. 2011, State of the Art in Stereoscopic and Autostereoscopic Display, IEEE (Year: 2011).*

Jung-YOung Son et al., Methods for Displaying Three-Dimensional Images, Mar. 2006, IEEE (Year: 2006).*

"Be there from anywhere", Project Starline. https://starline.google/, first downloaded Aug. 5, 2024.

"ELFSR1 Spatial Reality Display", https://electronics.sony.com/spatial-reality-display/p/elfsr1, downloaded on Mar. 5, 2020.

"Nanostructured Moth-Eye Anti-Reflective Coating", Synopsys, https://www.synopsys.com/photonic-solutions/product-applications/ rsoft-optimization-nanostructured-moth-eye.html, downloaded Apr. 27, 2020.

"Privacy Screens for Laptops, Computers & Monitors", Pinterest, https://in. pinterest.com/pin/656892295631728414, downloaded Apr. 27, 2020.

"We developed the World's Most Advanced 3D Display Technology", https://www.dimenco.eu, downloaded Mar. 5, 2020.

An, Jungkwuen , et al., "Slim-panel holographic video display", Nature Communications vol. 11, Article No. 5568 (2020), published Nov. 10, 2020.

Brar, Rajwinder Singh, et al., "Laser-Based Head-Tracked 3D Display Research", Journal of display technology, IEEE Service center, NY, US, vol. 6, No. 10, Oct. 1, 2010, pp. 531-543, XP011308937, ISSN: 1551-319X.

Broxton, Michael , et al., "Immersive Light Field Video with a Layered Mesh Representation", SIGGRAPH 2020 Technical Paper.

Chen, Renjie , et al., "Wide field view compressive light field display using a multilayer architecture and tracked viewers", Journal of the SID 22/10, 2015, pp. 525-534.

Dong, Yan-Yu , et al., "P-68: Dual-Side Floating Autostereoscopic 3D Display Based on Micro-Prism Array and Lenticular Sheet", SID Symposium Digest of Technical Paper / vol. 47, Issue 1, May 25, 3016.

Fink, Laura , et al., "Efficient Rendering for Light Field Displays using Tailored Projective Mappings", Proc. ACM Comput. Graph. Interact. Tech., vol. 6, No. 1, Article 3. Publication date: May 2023.

Geng, Jason , "Three-dimensional display technologies", IEEE Intelligent Transportation System Society, Advances in Optics and Photonics 5, 456-535 (2013) received May 28, 2013.

Gotsch, Dan , et al., "TeleHuman2: A Cylindrical Light Field Teleconferencing System for Life-size 3D Human Telepresence", CHI 2018, Apr. 21-26, 2018, Montreal, QC, Canada.

Huzaifa, Muhammad , et al., "Exploring Extended Reality with ILLIXR: A New Playground for Architecture Research", arXiv:2004. 04643v2, Mar. 3, 2021.

Kim, Kibum , et al., "TeleHum: Effects of 3D Perspective on Gaze and Pose Estimation with a Life-size Cylindrical Telepresence Pod", CHI 2021, May 5-10, 2021, Austin, Texas, USA.

Levoy, Marc , et al., "Light Field Rendering", ACM-0-89791-746-4/96/008, 1996.

Liou, Jian-Chiun , et al., "Dynamic LED backlight 2D/3D switchable autostereoscopic multi-view display", Journal of display technology, IEEE Service center, NY, US, vol. 10, No. 8, Aug. 1, 2014, pp. 629-634, XP0111551837, ISSN: 1551-319X, DOI: 10.1109/ JDT.2014.2307691.

Roach, Jacob , et al., "Samsung has a 3D gaming monitor that doesn't need glasses—and it actually works", Digitals Trends, Jan. 7, 2024.

Schaffner, Michael , et al., "Efficient image resampling for multiview displays", Acoustics, Speech, and Signal Processing, 1988. ICASSP-88., 1988 International Conference on Oct. 2013.

Stout, Andy , "Zeiss brings holograms to the mass market", RedShark News—Video technology news and analysis, Jan. 4, 2024.

Urey, Hakan , et al., "State of the art in stereoscopic and autostereoscopic displays", Proceedings of the IEEE, IEEE. New York, US, vol. 99, No. 4, Apr. 1, 2011 (Apr. 1, 2011), pp. 540-555. XP011363625, ISSN: 0018-9219, DOI: 10.1109/JPROC. 2010.2098351.

Vertegaal, Roel , "Real Reality Interfaces with Interactive Light Field Displays", IMID 2018 Digest.

Wang, Yuedi , et al., "Three-dimensional light-field display with enhanced horizontal viewing angle by introducing a new lenticular lens array", Optics Communications 477 (2020) 126327, received May 12, 2020.

Zhang, Xujing , et al., "LightBee:A Self-Levitating Light Field Display for Hologrammatic Telepresence", CHI 2019, May 4-9, 2019, Glasgow, Scotland, UK.

Zwicker, Matthias , et al., "Antialiasing for Automultiscopic 3D Displays", https://citeseerx.ist.psu.edu/document?repid=rep1&type= pdf&doi=44725c4b05d254340d85afa69dcb554f8da37faa, 2006.

* cited by examiner

Three dimensional content

Two
dimensional
content

Three dimensional content

Two
dimensional
content

Transparent screen

Parallax generator

Opaque screen

Transparent screen

Parallax generator

Opaque screen

Floating image
of a plane

Boundary of 3D canvas

Device 3D image 2D image

Device 3D image 2D image

Parallax
Generator
Transparent
Region
Piexl
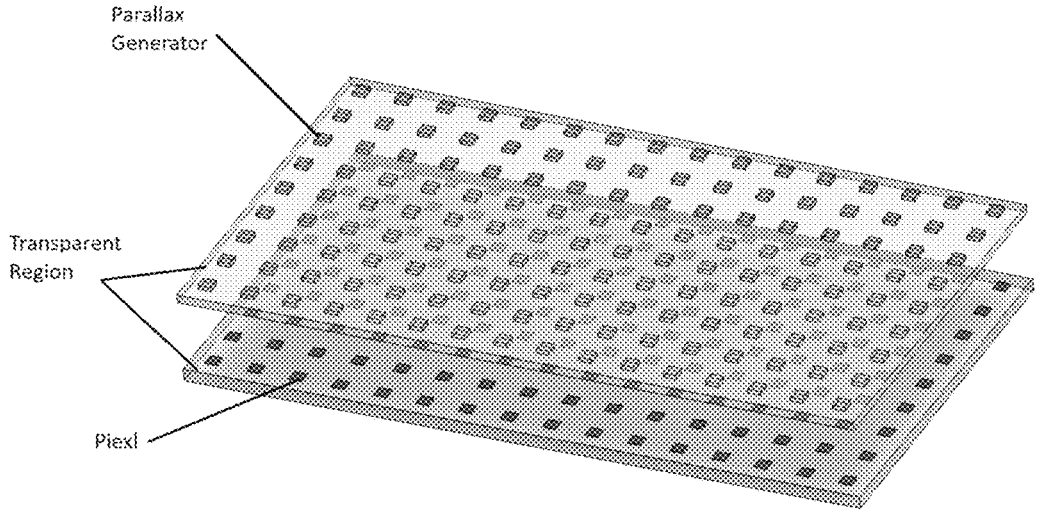
FFIGURE 11A
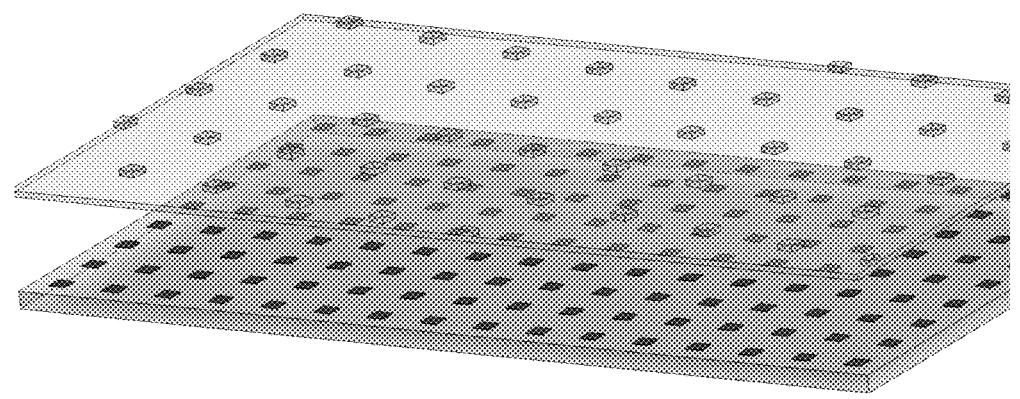
FFIGURE 11B Light blocker
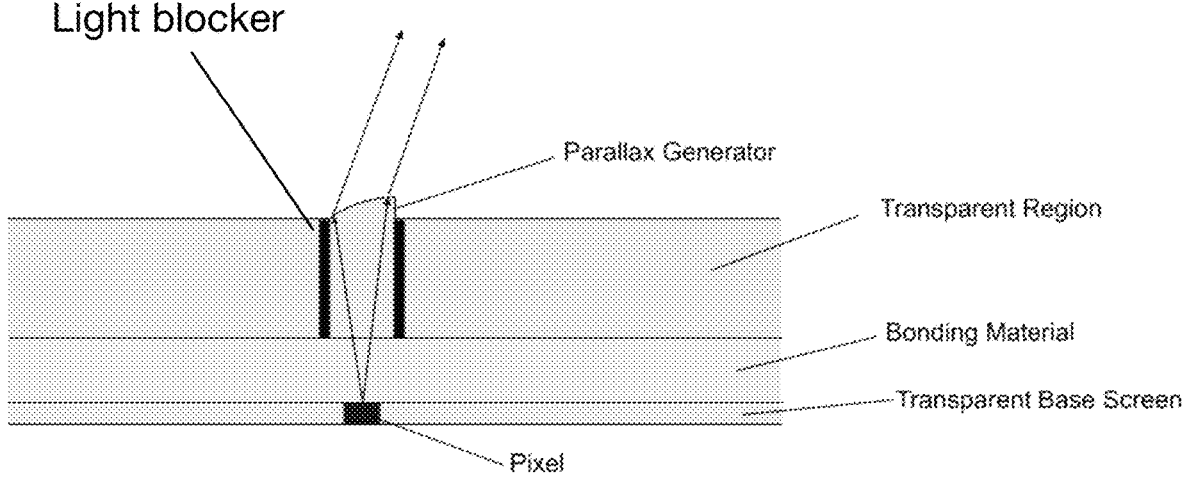
FFIGURE 11C
Light blocker
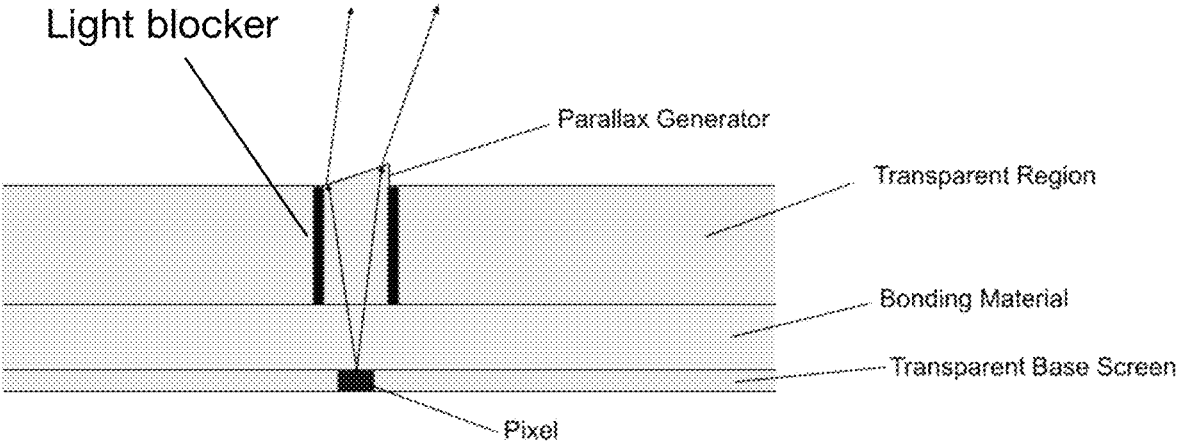
FFIGURE 11D

AUGMENTED SUPERSTEREOSCOPIC DISPLAY

CROSS-REFERENCE TO RELATED APPLICATIONS

This application claims the benefit of U.S. Provisional Application No. 63/579,751 filed 30 Aug. 2023, which is incorporated in its entirety by this reference.

TECHNICAL FIELD

This invention relates generally to the three-dimensional display field, and more specifically to a new and useful system and method in the three-dimensional display field.

BACKGROUND

The construction of multi-view 3D displays using a single screen comes mostly in two major directions: Temporal and Spatial multiplexing. A way to comprehend this idea is that the frame rate, per-view resolution, and the number of views in the given view cone of a 3D display share the same pool of resources—the multiple of the frame rate and the resolution of the underlying screen. 3D displays along the temporal multiplexing design direction result in a 3D display with a refresh rate lower than that of the base screen; while 3D displays along the spatial multiplexing design direction result in a 3D display with a per-view resolution lower than that of the base screen. In cases where spatial multiplexing is used, the reduced per-view resolution can be detrimental to the viewing experience when highly detailed images are expected. For instance, letters of relatively smaller sizes can sometimes be unreadable in 3D displays utilizing a spatial multiplexing technique (examples include, but are not limited to, designs utilizing lenticular, parallax barrier, and lens array) due to the reduction in per-view resolution.

Thus, there is a need in the three-dimensional display field to create a new and useful three-dimensional display system and method. This invention provides such new and useful three-dimensional display system and method.

BRIEF DESCRIPTION OF THE FIGURES

FIGS. 11A-11D are schematic representations of an example of a transparent screen and transparent parallax generator to form a transparent 3D screen.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
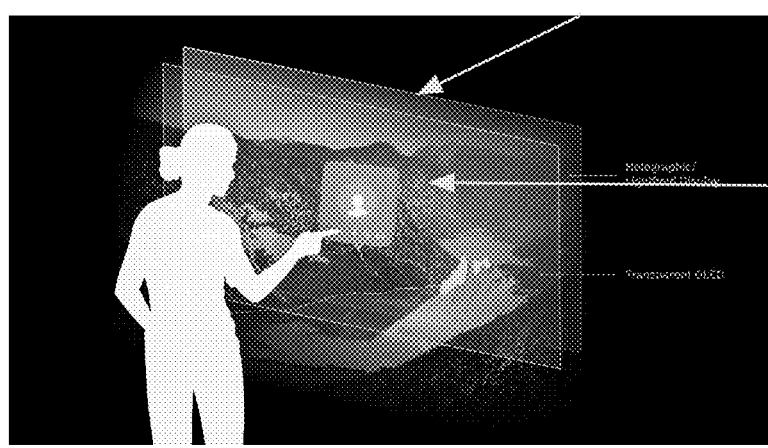
FIG. 1 is a schematic representation of an example of the apparatus.
Figure 2:
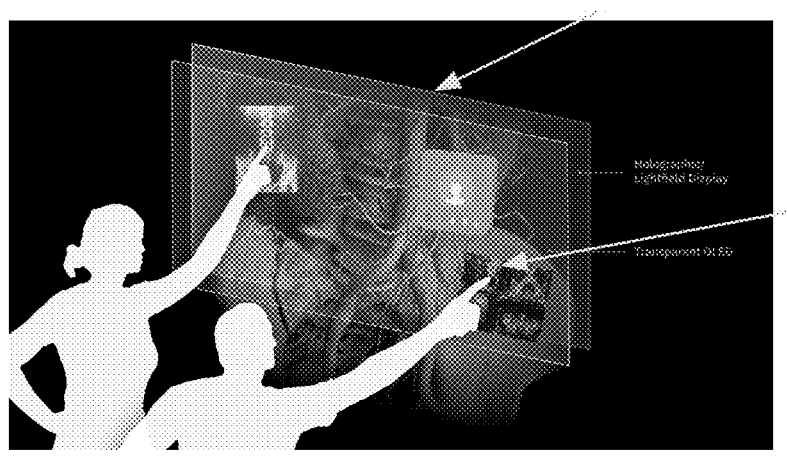
FIG. 2 is a schematic representation of an example of the apparatus.
Figure 3:
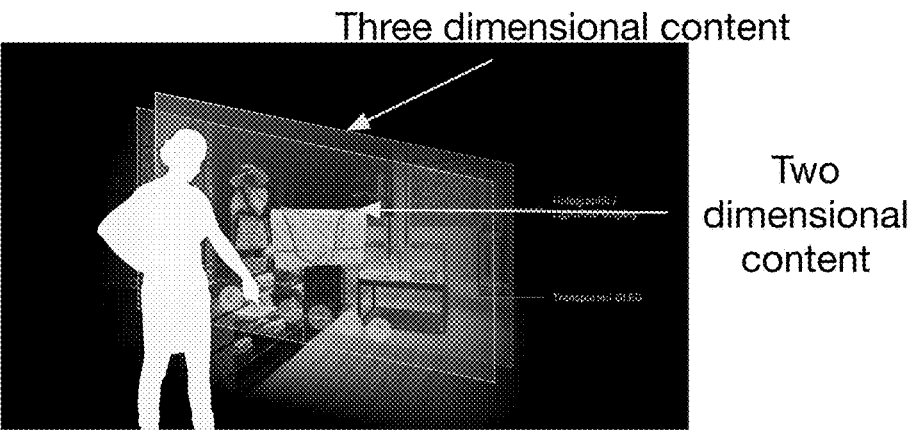
FIG. 3 is a schematic representation of an example of the apparatus.
Figure 4:
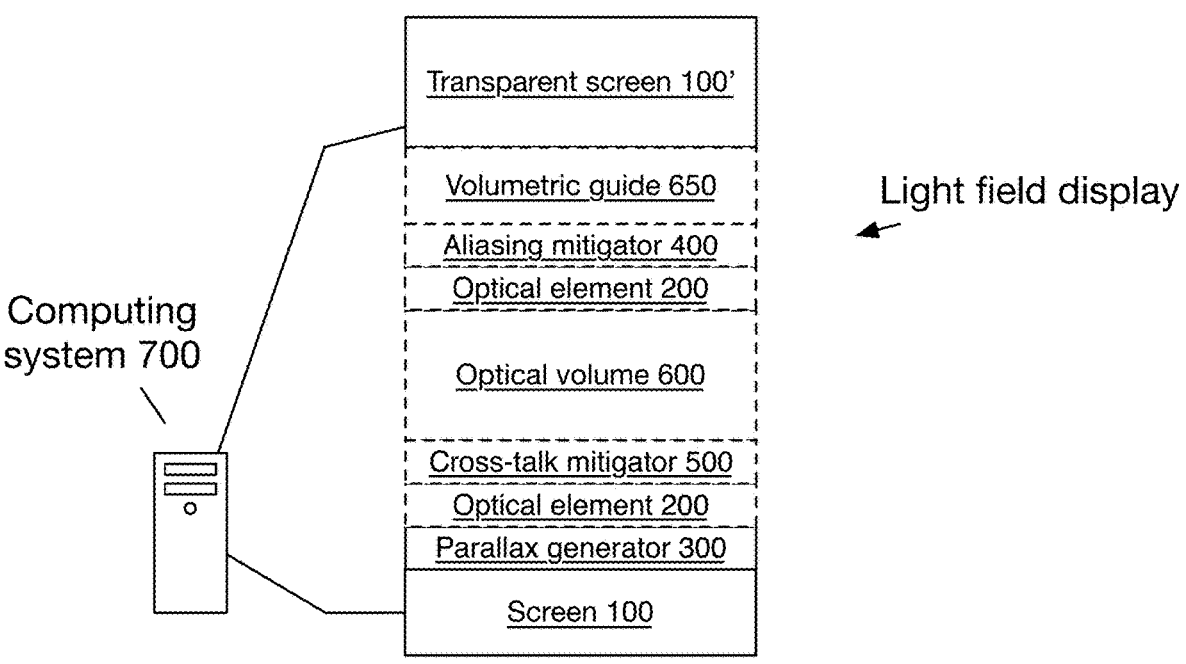
FIG. 4 is a schematic representation of an example of the apparatus.

As shown for instance in FIG. 4, the device 10 can include one or more: screen 100 100', optical element 200, parallax generator 300, aliasing mitigator 400, cross-talk mitigator 500, optical volume 600, volumetric guide 650, computing system 700, and/or any component. The display preferably functions to present a three-dimensional image (e.g., holographic image, lightfield image, etc.) to one or more viewers and/or direction dependent views (e.g., when different scenes are presented to different view directions, with or without the aid of tracking devices). The display preferably functions without the use of peripherals such as glasses (e.g., the three-dimensional image is perceived as three-dimensional for each of the viewers without the use of a peripheral). However, additionally or alternatively, the display can be used with peripherals (e.g., to enhance a tracking of a viewer, to enhance a three-dimensional perception, to enable three-dimensional perception, to control the positions of the viewers, etc.). The display can also be configured to display a two-dimensional image (e.g., simultaneously, contemporaneously, concurrently, etc. with or separately from the three-dimensional image as shown for example in FIG. 1, FIG. 2, and/or FIG. 3).

The device is preferably a display able to concurrently present one or more 2D images and 3D images. However, the device, in some variants, can be a transparent three-dimensional display (as shown for example in FIGS. 11A-11D). In different embodiments, the device can operate in one or more modes of operation such as operating in a 2D image display mode, a 3D image display mode, a concurrent 2D and 3D image display mode, and/or other suitable modes (e.g., based on resolution, fidelity, brightness, number of viewer(s), content to be viewed, external sensor data, etc.). In some variants, the display can operate in tracked modes (e.g., a tracked mode, a bounded number of viewers mode, unbounded number of viewers mode, between a tracked and untracked mode, and/or other such modes as described in U.S. patent application Ser. No. 18/225,603 titled SYSTEM AND METHOD FOR HOLOGRAPHIC IMAGE DISPLAY filed 24 Jul. 2023 which is incorporated in its entirety by this reference). In 2D image modes and/or 3D image modes, variants of the display that include both a 2D screen and a 3D screen (e.g., a 2D screen optically coupled to a parallax generator) can operate by displaying a single image (e.g., 2D image for 2D image mode, 3D image for 3D image mode such as by not operating the opposing screen) and/or can leverage the opposing screen for display of the image in the respective mode (e.g., a 3D screen can be operated concurrently with the 2D screen in the 2D image mode where the 3D image projected by the 3D screen can be selected or configured to enhance the 2D image such as acting as being used to act as pixels in between pixels of the 2D screen; a 2D screen can be operated concurrently with the 3D screen in the 3D image mode where the 2D image projected by the 2D screen can be selected or configured to enhance the 3D image such as acting as a volumetric guide or frame to enhance perception of depth in the 3D image, obscure or wash out regions of the 3D image, increase a resolution of the 3D image from specific viewing angles, etc.; etc.). However, the modes can otherwise operate. The mode of operation can depend on the image(s) to be displayed, number of viewer(s), viewer pose, display, and/or other suitable criteria (e.g., mode selection by image creator), where the operation mode can switch based on a change in the criteria (e.g., automatically switch, manually switch, etc.).

These devices can be used for a variety of applications. For instance, these devices can be beneficial for directions (e.g., providing a 2D map and 3D overlay of an area, providing a 2D map and a 3D holographic assistant, etc.), for marketing (e.g., a 2D specification sheet and a 3D view of an object), telecommunications (e.g., a 2D presentation and a 3D presenter, a 2D video feed of a presenter and a 3D presentation; where a 3D information can for example be provided in a manner as described in any of U.S. patent Ser. No. 11/256,214 titled 'SYSTEM AND METHOD FOR LIGHTFIELD CAPTURE filed on 19 Oct. 2020, U.S. patent Ser. No. 11/415,935 titled 'SYSTEM AND METHOD FOR HOLOGRAPHIC COMMUNICATION' filed on 23 Jun. 2021, and/or U.S. patent application Ser. No. 17/864,844 titled 'SYSTEM AND METHOD FOR AUGMENTING LIGHTFIELD IMAGES' filed 14 Jul. 2022, each of which is incorporated in its entirety by this reference), augmented reality, building facades, and/or in many other applications.

2. Benefits

Variations of the technology can confer several benefits and/or advantages.

First, variants of the technology can enable contemporaneous (e.g., simultaneous, concurrent, overlapping, etc.) display of two-dimensional and three-dimensional images. These variants can be realized, for instance, in displays with thin form factors (e.g., less than 12" thick, 6" thick, 4" thick, etc.). For example, a lightfield display (e.g., a display as disclosed in U.S. Pat. No. 10,191,295 entitled 'ADVANCED RETROREFLECTING AERIAL DISPLAYS' filed on 5 Jan. 2018, U.S. patent application Ser. No. 17/328,076 entitled 'SUPERSTEREOSCOPIC DISPLAY WITH ENHANCED OFF-ANGLE SEPARATION' filed on 24 May 2021, U.S. patent application Ser. No. 17/326,857 entitled 'SYSTEM AND METHOD FOR HOLOGRAPHIC IMAGE DISPLAY' filed on 21 May 2021, and/or U.S. patent application Ser. No. 17/332,479 entitled 'SYSTEM AND METHOD FOR HOLOGRAPHIC DISPLAYS' filed 27 May 2021, each of which is incorporated in its entirety by this reference) can generate the three-dimensional image and a transparent screen (e.g., overlaid on the lightfield display such as on the optical volume of the lightfield display, covering a frame of the lightfield display, etc.) can present the two-dimensional image (e.g., without or with minimal distortion to the three-dimensional image).

Second, variants of the technology can improve a viewer experience of interacting with a three-dimensional image. For example, a three-dimensional image can be modified (e.g., to extend into space beyond the transparent screen) to provide visual feedback of a viewer interaction (e.g., alternative to or in addition to auditory feedback) with a floating image (e.g., from the transparent screen, two-dimensional image, three-dimensional image, etc.).

Third, variants of the technology can reduce a size and/or volume for displaying technology. For instance, a holographic display can be used to simulate or present a three-dimensional image of a scene or object without requiring the full space required to house the scene or object and the transparent screen can be used to overlay information on the three-dimensional image (e.g., the transparent screen can be used as a transparent wall for a three-dimensional image). Moreover, since both 2D and 3D information can be presented on the same device, the need to host two separated screens can be diminished.

Fourth, variants of the technology can improve a perceived quality of the images. For instance, images can be processed and/or displayed in a manner to reduce aliasing within an image (e.g., by duplicating or expanding pixel color information). In another example, a diffuser (typically arranged between the 2D screen and 3D screen) can be beneficial for mitigating or removing a Moiré pattern or other aliasing effects that can be generated by stacking two or more screens. In variants with additional screens (e.g., a 3D screen and a plurality of 2D screens), a diffuser can be included between each screen pair and/or before a final screen in a stack of screens.

Fifth, variants of the technology can enable multi-viewer 3D displays without the use of peripheral devices (e.g., where more than 1 person can contemporaneously perceive depth in the 3D images).

Sixth, variants of the technology can enable large (e.g., greater than about 27 inch) displays. For instance, the technology can enable displays with sizes between about 32 and 80 inches. These are not limiting ranges, in some variations (e.g., by changing a screen pixel size, pixel or subpixel arrangement, parallax generator, etc.), billboard sized displays (e.g., 40-50 feet displays) and/or larger displays can be realized that can present contemporaneous 2D image(s) and 3D image(s). Note, this technology is not limited to only large displays, but can also be used in smaller devices (e.g., 5-27 inch displays).

Seventh, variants of the technology can result in improvement of perceived resolution for 2D content (e.g., 2D content presented within a 3D image). Due to spatial multiplexing, the per-view resolution on a 3D display can be significantly lowered than for the base screen alone. As such, 2D content (e.g., alphanumeric characters) can experience a deterioration in quality from the reduced perceivable resolution. In some examples, inclusion of a 2D screen with the 3D display can act a canvas to host 2D content (e.g., assuming that the perceived resolution of the 2D screen is higher than that on the 3D display).

Eighth, variants of the technology can enable retina-level or near-retina level perceived image resolution (e.g., in 3D images). For example, the application of anti-aliasing corrections (optionally combined with high resolution base screens) can result in significant improvements to the perceived image resolution. The improved perceived image resolution can be achieved in 3D displays, combined 3D and 2D displays, multiviewer displays, and/or single viewer displays (e.g., tracked 3D displays, temporally multiplexed displays that can switch between 3D and 2D, etc.). and/or can be applied to other suitable displays.

However, variants of the technology can confer any other suitable benefits and/or advantages.

3. Device

As shown for instance in FIG. 4, the device can include one or more: screen, optical element, parallax generator, aliasing mitigator, cross-talk mitigator, optical volume, volumetric guide, a computing system, and/or any component. The display preferably functions to present a three-dimensional image (e.g., holographic image, lightfield image, etc.) to one or more viewers. The display preferably functions without the use of peripherals such as glasses (e.g., the three-dimensional image is perceived as three-dimensional for each of the viewers without the use of a peripheral). However, additionally or alternatively, the display can be used with peripherals (e.g., to enhance a tracking of a viewer, to enhance a three-dimensional perception, to enable three-dimensional perception, etc.). The display can also be configured to display a two-dimensional image (e.g., simultaneously, contemporaneously, concurrently, etc. with or separately from the three-dimensional image as shown for example in FIG. 1, FIG. 2, and/or FIG. 3).

The device preferably operates based on a set of operation parameters. The operation parameters can include: number of viewers, mode of operation (e.g., interactive mode; display mode; static mode such as to display a still image; dynamic mode such as to display a video; tracking mode; 3D image mode; 2D image mode; concurrent 3D image and 2D image mode; etc.), brightness, contrast, color mode (e.g., black and white, RGB, etc.), calibration parameters (e.g., alignment between the pixel grid and the lenticular grid, slope, center, pitch, serial number, model number, change in slope, change in center, change in pitch, display viewcone inversion, flip controller viewcone, etc.), pixel (and/or sub-pixel) arrangement, power, and/or any suitable operation parameters.

The screen(s) 100 100' preferably functions to output light (e.g., in specific directions, with specific colors, etc.). The screen can include a light source, be ambiently lit (e.g., via an external light source), be activated electrically, and/or can otherwise output light (e.g., modify, shape, etc. light) to form image(s) perceivable by viewer(s).

In variants including a plurality of screens, one screen is typically an opaque screen and the remaining screens are often transparent (e.g., a screen with opaque pixels where regions between the pixels are substantially transparent; also referred to as a 'see-through screen'), where images from the opaque screen (e.g., light output from the opaque screen) passes through the transparent screen(s). In these variants, the opaque screen often acts as a 3D display (e.g., is optically coupled to a parallax generator) while the transparent screen(s) act as 2D displays. The distance between the screens (e.g., the screen offset) can depend on the maximum 3D depth of the 3D screen (e.g., a depth where certain extent of degradation in the 3D content becomes detectable, in some situations a displayable depth, etc.), the screen and/or device size, the screen layering and/or orientation, the number of screens, the screen transparency (e.g., actual transparency of any transparent screens), the severity of aliasing, the effectiveness of the aliasing mitigation (e.g., my software or hardware design), and/or other related design criteria. For example, the opaque screen and the transparent screen can be offset by between about 3-5 cm (e.g., for a 5-20 inch display). In a preferred embodiment, the transparent screen is offset by a distance from the opaque screen that is less than the maximum 3D depth associated with the opaque screen (e.g., so that the 2D image can appear in front of or behind the 3D image, so that the 2D image can appear closer to or further from the viewers than the 3D image). In another embodiment the transparent screen can be offset by a distance that is substantially equal to the maximum 3D depth associated with the opaque screen. In another embodiment, the transparent screen can be offset by a distance that is greater than the maximum 3D depth associated with the opaque screen (e.g., such that the 2D image appears closer to the viewers than the 3D image).

However, additionally or alternatively, a plurality of transparent screens can be stacked to act as a 3D display, a transparent screen can be combined with a transparent parallax generator to form a transparent 3D display (e.g., as shown for example in FIGS. 11A-11D; where an optional opaque screen can be combined with the transparent 3D display to act as either an additional 3D display or as a 2D display), and/or any suitable screens can be used (e.g., in some variants a single opaque screen can be used as the basis of a 3D display particularly, but not exclusively, to leverage some of the processing or computing system advantages).

In variants with an opaque screen, the opaque screen can be a liquid crystal screen (e.g., including a light source such as a back light, front light, etc.; a set of polarization optics; a liquid crystal screen; etc. such as arranged), an organic light emitting diode (OLED) screen, a quantum-dot light emitting diode (QD-LED) screen, a cathode ray tube (CRT) screen, a micro-LED screen, a mini-LED screen, and/or any suitable technology.

In variants with a transparent screen, the transparent screen can be a transparent projector screen (e.g., for a front lit projector, off-axis illuminated projector, back lit projector, etc.), a transparent liquid crystal (e.g., where a light source can be the same as or separate from a light source for an underlying opaque display), a transparent organic light emitting diode, a transparent light emitting diode, a transparent microlight emitting diode, persistence of vision screen (e.g., spinning fan display), electroluminescent screen, photoluminescent screen (e.g., technologies in line with fluorescent, phosphorescent, quantum dots, etc.), and/or other suitable transparent screen.

The screen(s) are preferably associated with a plurality of pixels. The pixels can be individually addressable light emitters, individually addressable light blockers (e.g., liquid crystal modulators), subsets of contemporaneously addressable light emitters, subsets of contemporaneously addressable light blockers, and/or any suitable element. The pixels are preferably arranged on a pixel grid, but can be arranged in any suitable manner. The pixel grid can be a regular grid (e.g., a linear grid), a curvilinear grid, skewed grid, an irregular grid, and/or any suitable grid. Each pixel can be square, rectangular, circular, oblate, polygonal, and/or any suitable shape. Each pixel can be in contact with neighboring pixels and/or separated from neighboring pixels (e.g., by a pixel separation distance). Each pixel can be individual addressable or addressable in sets of pixels (e.g., super pixels). The screen can include any number and/or range thereof of pixels between about 1 and $1 \times 10^8$ pixels such as 10, $1 \times 10^2$, $1 \times 10^3$, $1 \times 10^4$, $1 \times 10^5$, $2.3 \times 10^5$, $5 \times 10^5$, $1 \times 10^6$, $2 \times 10^6$, $5 \times 10^6$, $1 \times 10^7$, $2 \times 10^7$, $6.7 \times 10^7$ pixels. However, the screen can include more than $1 \times 10^8$ pixels, and/or any suitable number of pixels. In specific examples, the pixels can be arranged in rectangular grids that are 640×360, 800×600, 1024×768, 1280×720, 1280×1024, 1360×768, 1600×900, 2560×1440, 3840×2160, 7680×2160, 8192×4608, 8192×8192 pixels, and/or any pixel resolution.

Each pixel can include one or more sub-pixels. In a specific example, each pixel can include three sub-pixels wherein each sub-pixel corresponds to a different color (e.g., a red sub-pixel, a blue sub-pixel, and a green sub-pixel). In a second specific example, each pixel can correspond to five sub-pixels. However, each pixel can correspond to any suitable number and/or type of sub-pixels. Each sub-pixel can be square, rectangular, circular, oblate, polygonal, and/or any suitable shape.

The plurality of screens are preferably calibrated relative to one another (e.g., have a known alignment such that an alignment between 2D content and 3D content is known). As a first example, calibration can be achieved using at least 2 subpixels and/or pixels on the transparent 2D layer to align with at least 2× subpixels or pixels on the 3D layer. As a second example, calibration can be accomplished by looking at the physical or active pixel edge of the 2D layer and aligning with 3D content on the 3D layer. In a variation of the second example, at least 2× pixels on the transparent 2D layer can be aligned with a single 3D pixel on the 3D layer (e.g., with a camera that reads into calibration at specific angles). While in these two examples reference is made to 2 pixels, any suitable number of pixels can be used and/or any suitable calibration pattern (e.g., checkerboard pattern, circular pattern, dot pattern, ChArUco pattern, ArUco pattern, Kalibr, etc.) can be used. The calibration can be performed manually (e.g., by a viewer) and/or automatically (e.g., using an image detection algorithm and camera set up). These screen calibration (e.g., multi-layer alignment calibration value) is preferably stored as a part of the calibration (e.g., in conjunction with or separate from a calibration of a 3D screen).

The optional optical element(s) 200 preferably function to change characteristics of the emitted light (e.g., light and/or views emitted from the screen). The optical elements can function to reduce stray light (e.g., light that bypasses the pixels) from reaching a viewer. Characteristics of the emitted light can include: intensity, wavelength (e.g., color), spatial location of the emission of the optical radiation from the display (e.g., pixel location), polarization, phase, collimation, spread (e.g., the spatial distribution of light from a source, divergence, etc.), and/or any suitable characteristics. Examples of optical elements can include: polarizers (e.g., wire-grid, transmission, reflection, absorption, etc.), waveplates (e.g., half waveplates, quarter waveplates, etc.), lenses (e.g., spherical, aspherical, cylindrical, lenticular, lens array, Fresnel's lens, etc. with any suitable focal length such as between 10 mm and 1000 mm), neutral density filter, color filter (e.g., reflective filters, absorptive filters, etc.), spatial light modulators (e.g., electrooptic modulators, liquid crystals, microelectromechanical (MEMS) mirrors, etc.), and/or any suitable optical elements.

The parallax generator 300 functions to provide (and/or appear to provide) different views of a scene to a viewer (e.g., a different view to each eye of a viewer, different views to each viewer, views that depend on the viewers location relative to the display, etc.). The parallax generator is preferably downstream of the screen (e.g., along the light propagation direction). The parallax generator can be separated from (e.g., by a separation distance such as generated by a housing, a frame, by optical elements, etc.) and/or in contact with the screen, optical elements, the optical volume, a crosstalk mitigator, and/or any suitable component. The parallax generator is preferably a lens array (e.g., lenticular array, fly-eye lens array, prism lens array, trapezoidal prism lens array, etc.), but can be a parallax barrier (e.g., a series of baffles aligned to pixels and/or subpixels of the screen) and/or any suitable parallax generator.

The lens array is preferably a set of lenses (e.g., lenticules) arranged on a lenticular grid (e.g., each corner of the grid corresponds to a lens such as a center of the lens, a top of the lens, a bottom of the lens, a left side of the edge, a right side of the edge, etc.; each edge corresponds to a lens such as a center of the lens, a top of the lens, a bottom of the lens, a left side of the edge, a right side of the edge, etc.; etc.). The lenticular grid is preferably a regular grid such as a linear grid, a curvilinear grid, skewed grid, and/or any suitable regular grid. However, the lenticular grid can be irregular (e.g., include non-equal spacing). Each lens of the set of lenses is preferably identical (e.g., shape, size, focal length, material, etc.). However, one or more lens of the set of lenses can be different (e.g., multiple designs of lens array can co-exist on the same element in certain distributions such as interlaced at certain ratio that may or may not be constant over the whole screen area).

The pitch (e.g., the separation distance between lenses such as along a lateral extent of the lenticular array, along a longitudinal extent of the lenticular array, etc.) can be any suitable value between 10 μm and 1 mm such as 20 μm, 50 μm, 100 μm, 200 μm, 500 μm, 750 μm. However, the pitch can be less than 10 μm, greater than 1 mm, and/or any value.

Each lens can be a microlens (e.g., have a lens diameter less than about 1 mm such as 10 μm, 50 μm, 100 μm, 250 μm, etc.). However, each lens can have any suitable size (e.g., larger than 1 mm). The focal length for each lens can be any suitable value between about 10 μm and 1 mm. However, the focal length can be any suitable value.

The material for each lens can be plastic (e.g., acrylic such as PMMA, APET, PETG, LENSTAR® Plus, Polycarbonate, Polypropylene, PVC, polystyrene, etc.), glass, liquid crystal, and/or any suitable material can be used.

The lens array is preferably aligned to intersect the pixels of the screen. The lenticular grid can be rotated by an angle (e.g., between 0-90°) relative to the pixel grid (as shown for example in FIG. 11B), parallel to the pixel grid, perpendicular to the pixel grid, and/or otherwise oriented. However, the lenticular array and the screen can not be aligned, and/or the lenticular array can otherwise be aligned to the screen.

Each pixel (or subpixel) of the screen is preferably associated with a lenticule of the lens array. Typically, the number of pixels is larger than the number of lenticules; however, the number of lenticules can be the same as and/or greater than the number of pixels (e.g., for large displays; for displays using large pixels such as mini-LEDs, signages, etc.; for displays with steerable back lights; etc.). Any number of pixels or subpixels (e.g., 1, 2, 5, 10, 20, 40, 50, 100, 200, 500, >500, values therebetween, etc.) can be associated with a lenticule. The lenticule is preferably associated with the closest pixel (or subpixel), but can be associated with any suitable pixel. However, the lenticules can be associated with any pixel(s) and/or subpixels.

In some variants (e.g., to form a transparent 3D display), the lens array can be substantially transparent. In these variants, the majority of the surface of the lens array (e.g., a substrate on which the lens array is disposed) preferably does not substantially diffract light (e.g., does not substantially focus or defocus) light transmitted through the lens array. Alternatively phrased, in these variants, only a small area of the lens array can be designed to diffract light (e.g., <10% of the area, <20% of the area, <30% of the area, etc.). As shown for example in FIG. 11A, FIG. 11C, or FIG. 11D, the diffractive regions can be patterned to be only disposed over the pixels of a screen that transmits output light through the lens array (relatedly, as shown for instance in FIG. 11C, only a portion of a curvature of the lenticule need be formed and/or as shown for instance in FIG. 11D, a lenticule can have a slanted but substantially planar surface). The lens array (or parallax generator) of these variants can be formed, for instance, by infilling a lens array with an index matched material in regions that should not diffract light, by etching structures away in regions that should not diffract light, by depositing lenticules only in regions that should diffract light (e.g., by masking other regions), and/or in any manner.

One or more lenticules of the lenticular array can be spherical, aspherical, hemispherical, spherical segment, cylindrical, acylindrical, axicon, Fresnel lens, parabolic, and/or can have any suitable shape (that can focus light inclusive of layered materials with differing indices of refraction, material with gradually changing index, liquid crystal, etc.). Additionally or alternatively, the lens may also be tunable or change with time (e.g., tunable lenses, liquid lenses, etc.).

The lenticules and/or lenticular array (e.g., a surface of the lenticular array, the material of the lenticular array, etc.) can be configured to focus on the same focal plane (e.g., the plane of color filters on the 3D screen, the viewer position, the screen elements, etc.) or different focal planes. This is particularly beneficial in the second embodiment where different lenticules can have different distances from the plane, but can be used for any lenticular array. In a series of examples, the lenticles can: include different indices of refraction (e.g., a different index of refraction material can be associated with each lenticule where the index of refraction depends on the distance between the lenticule and the plane; a gradient index of refraction, etc.), different curvatures (e.g., each lenticule can have a curvature that depends on the distance, a nonspherical shape where the shape or local curvature depends on the distance between the specific point of the lenticule, etc.), an additional microlens (e.g., a different microlens associated with each lenticule where the microlens focal length depends on the distance to the plane, where the microlens can be above or below the lenticule), and/or in any suitable manner.

Figure 8:
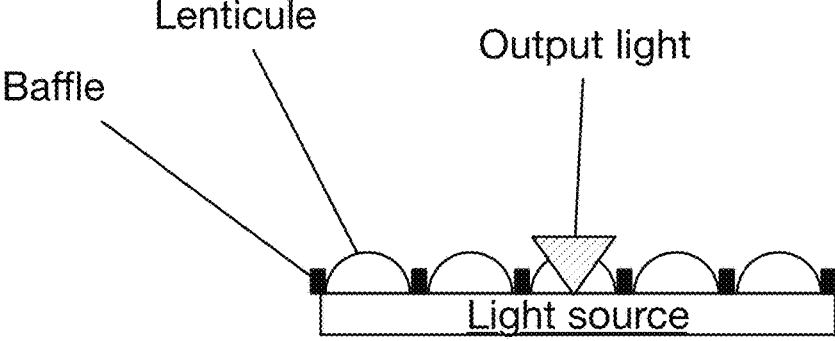
FIG. 8 is a schematic representation of an example of a 3D screen that includes a crosstalk mitigator (e.g., a baffle in this specific example).
Figure 9:
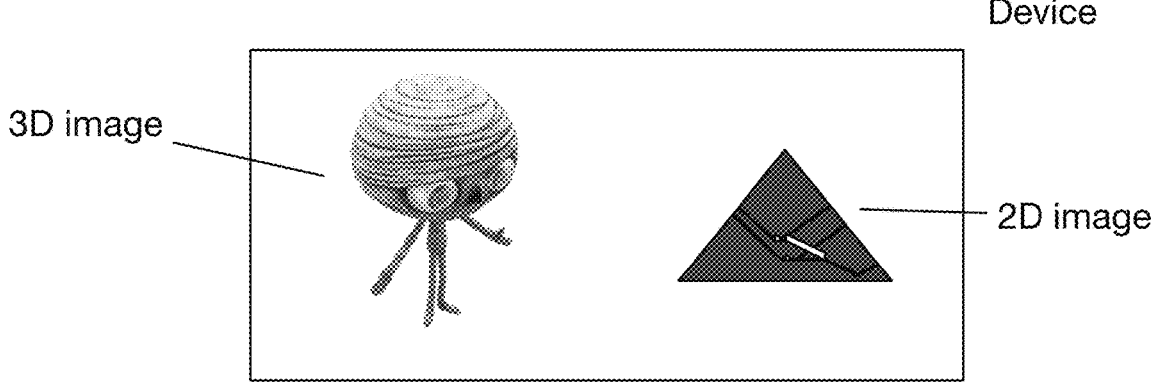
FIG. 9 is a schematic representation of an example of adjusting a position of a 3D image and a 2D image and/or presenting a 3D image and a 2D image in nonoverlapping portions of a display.
Figure 10:
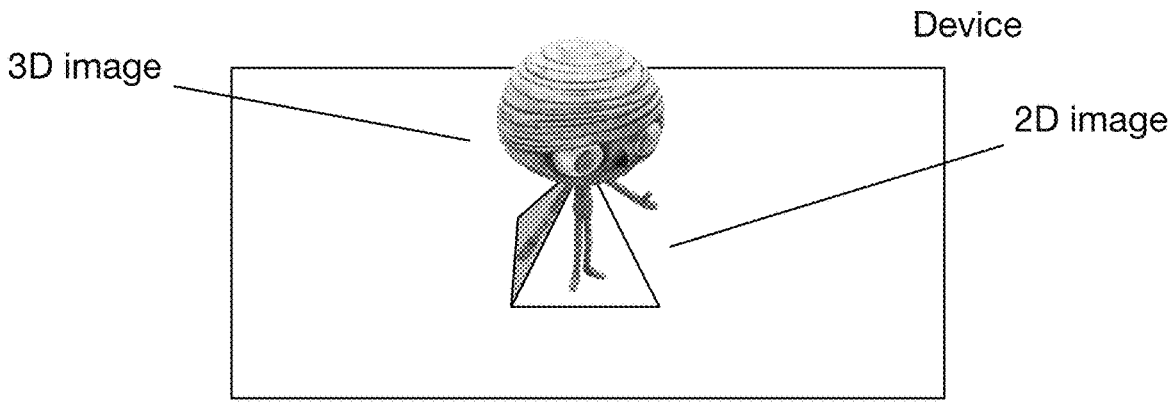
FIG. 10 is a schematic representation of an example of an overlapping 3D and 2D image (with optional occlusion).

The crosstalk mitigator preferably functions to reduce (e.g., (e.g., by 10%, 20%, 30%, 40%, 50%, 60%, 70%, 80%, 90%, 100%, etc.) and/or eliminate crosstalk from the displayed free-space 3D image(s) (e.g., reduce flip, reduce image blurring, reduce perception of a view expected in one viewing position from being perceived in a second viewing position, etc.). As such, the crosstalk mitigator can function to reduce the amount of (e.g., block) output light from proceeding along undesired paths (as shown for example in FIG. 8). For instance, the crosstalk mitigator can decrease, minimize, remove, and/or otherwise mitigate ghosting, viewcone flipping, and/or other forms of ghosting (e.g., perception of a view from a undesired angle or viewer position) by hindering light from a pixel from entering and/or leaving multiple lenticules, by hindering light output from a lenticule, and/or can otherwise mitigate crosstalk. The crosstalk mitigator can reduce and/or eliminate the crosstalk by: blocking light, by generating destructive interference at locations where views should not be perceived, generating constructive interference at locations where views should be perceived, reducing stray light, and/or in any manner. The crosstalk mitigator can be reflective, absorptive, scattering, transmissive, and/or have any suitable optical response to light. The optical response of the crosstalk mitigator can depend on a direction of the incident light, a polarization state of the light, an intensity of the light, a color of the light, a spectrum of the light, a dispersion of the light, a divergence of the light, and/or on any suitable property(ies) of the light.

The crosstalk mitigator can be integrated into the parallax generator (e.g., be a coating on an element of the parallax generator, collocated with the parallax generator (e.g., adjacent to, next to, etc.), be a predetermined distance from the parallax generator, and/or otherwise be related to the parallax generator. The crosstalk mitigator can be arranged between the parallax generator and the screen, between the parallax generator and the optical volume, between elements of the parallax generator (e.g., between elements of the parallax generator such as lenticules), partially or fully surrounding elements of the parallax generator, adjacent to the screen, adjacent to the view cone expander, adjacent to the optical elements, adjacent to the optical volume, and/or otherwise arranged.

Light (e.g., output from the screen) can interact with (e.g., passes through) the parallax generator before, at the same time, and/or after interacting with (e.g., passing through) the crosstalk mitigator.

The crosstalk mitigator can be active or passive. Each crosstalk mitigator can include one or more: baffles (e.g., optical baffle), louvers, filters (e.g., color filter, neutral density filter, etc.), specular surfaces (e.g., mirrors), polarization optics (e.g., polarizers, waveplates, etc.), diffraction elements (e.g., gratings, prisms, grisms, etc.), structures (e.g., rectangular prisms), and/or any suitable components. Each crosstalk mitigator can be made of polymer, glass, crystals, metal, resin, ink, air or vacuum gap, and/or any suitable material. For example, a privacy film (e.g., an array of louvers or microlouvers) can be used as a crosstalk mitigator. As another example, a crosstalk mitigator can be formed from a lenticular array combined with a aperture stops (e.g., a lens array with an optical barrier between each lens or lenticular of the array, a lens array with an optical barrier above each lens or lenticular, etc.), where in this example, the optical barrier can provide a further benefit of reducing optical aberrations (e.g., spherical aberration, coma, astigmatism, field curvature, distortion, chromatic aberration, etc.) in light passing through the lenticular. However, other suitable crosstalk mitigator(s) can be used.

The optional aliasing mitigator preferably functions to reduce (e.g., (e.g., by 10%, 20%, 30%, 40%, 50%, 60%, 70%, 80%, 90%, 100%, etc.) and/or eliminate aliasing from the displayed free-space 3D image(s) (e.g., resulting from the light passing through a transparent display). The aliasing mitigator is preferably a physical component integrated into the device. However, the aliasing mitigator can additionally or alternatively include a digital aliasing mitigator. Exemplary aliasing mitigators include: diffusers (e.g., nano-structure pattern, ground glass diffuser, Teflon, opal glass, greyed glass, diffractive diffuser, diffusion gel, silk sheet, photopolymeric diffuser, polycarbonate diffuser, polyethylene terephthalate diffuser, polyethylene diffuser, light shaping diffuser, etc.), homogenizer (e.g., diffractive beam homogenizer, microlens array, etc.), and/or other suitable aliasing mitigators can be used.

In variants that leverage a diffuser, the diffusing angle (e.g., full width half max diffusing angle) is preferably small (e.g., 0.1-5° or values or ranges contained therein). When the diffusing angle is too large crosstalk between can be significant and/or a perceivable depth can be reduced, while if the diffusing angle is too small the aliasing remains in the output light. The diffusing angle can be symmetric (e.g., circular) or asymmetric (e.g., elliptical, diffusing in a single direction typically parallel to a distribution direction of distinct views, etc.).

Figure 7:
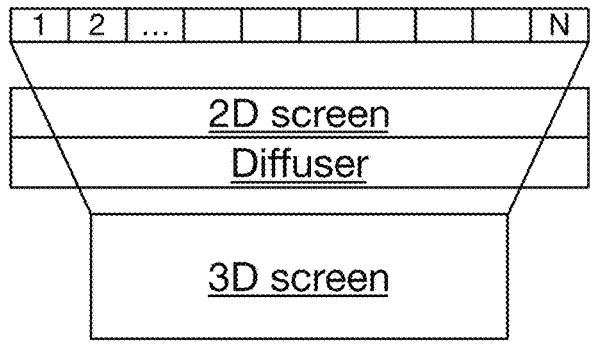
FIG. 7 is a schematic representation of an example of a display.

The aliasing mitigator is preferably between screens (e.g., between an opaque screen and a transparent screen, between a 2D screen and a 3D screen, etc. such that only light output from upstream optical components passes through the aliasing mitigator). However, the aliasing mitigator can be a furthest downstream optical component (e.g., light output from each screen can pass through the aliasing mitigator)

and/or can otherwise be arranged. The aliasing mitigator is preferably close to (e.g., adjacent to, in contact with, etc.) the further downstream optical component that does not contribute to light passing through the aliasing mitigator. For example (as shown for instance in FIG. 7), the aliasing mitigator (a diffuser in this example) is on a backside of a transparent screen such that light from an opaque screen passes through the aliasing mitigator prior to passing through the transparent screen. However, the aliasing mitigator can otherwise be arranged.

In variants of the device that leverage a screen with no apparent periodic structure (e.g., a reflective screen, a projector screen, etc.), an aliasing mitigator may not be needed (e.g., when the prior layers do not form an aliased image or when aliasing from the prior layers are not severe or noticeable). In cases where the prior layers are aliased, the reflective screen can sometimes act as the aliasing mitigator for other screens and/or an additional aliasing mitigator can be excluded from the device.

The optional optical volume 600 can function to enhance the perception of (e.g., the perception of depth, smoothing artifacts, etc.) the free-space 3D image. While the term volume is used, a linear and/or areal guide or optical reference can additionally or alternatively be used in these variants. The optical volume can improve the separation between views, change the perceived size of objects in the view(s), provide depth guide for the view(s), and/or otherwise enhance the perception of the free-space 3D image. The optical volume is preferably close to (e.g., within a threshold distance of, within 50 μm-1 cm of, etc.), but separated from (e.g., by an air gap), the parallax generator, but can be in contact with the optical elements, the screen, the viewcone expander, the flip controller, the parallax generator, and/or with any suitable component. The optical volume can include (e.g., be demarcated by, be defined by, be marked with, etc.) volumetric guides which can function to indicate or facilitate perception of the optical volume.

The optical volume can include a volumetric guide that can function to serve as an optical anchor at a different depth that the 3D screen (e.g., to help outline the optical volume, improve viewer perception of the 3D image, etc.). In one embodiment of an optical volume, a volumetric guide can be defined by a frame (or other structure) surrounding the optical volume. In these embodiments, the optical volume can be a volume (e.g., a volume of air) enclosed or surrounded by the frame, extend into an external environment proximal the frame (including or excluding the enclosed volume), and/or can otherwise be arranged. In variations of this specific example, the optical volume can be in free space (e.g., air), which can enable a viewer to directly interact with the free-space 3D image. However, the optical volume can be an enclosed volume (e.g., where a viewer cannot directly interact with the free-space 3D image; a high index optical block for instance with an index of refraction n≥1.4, 1.5, 1.6, 1.7, 1.8, 2.0, etc.; etc.), be defined by a surface of an optical components, and/or have any suitable properties.

In another embodiment, the volumetric guide can (additionally or alternatively to the first volumetric guide embodiment) be formed from a screen and/or via light output by the screen. For instance, a transparent screen can be illuminated in a manner that appears to form a frame (and/or the light output by the second screen can act as a volumetric guide) or image highlighting the 3D image. However, the optical volume can otherwise be formed.

The computing system 700 preferably functions to receive, store, process, manipulate, compute, and/or otherwise prepare one or more images to be displayed using the one or more screens. The computing system is preferably local to the device. However, the computing system can be remote (e.g., implemented in a cloud server) and/or distributed in any manner (e.g., between a local and a remote computing system and/or processors thereof).

The 3D image is preferably represented as a quilt image (inclusive of a depth quilt, a plurality of different views or images of a subject from different perspectives stored within a single image container, as described in U.S. patent application Ser. No. 18/137,720 titled 'SYSTEM AND METHOD FOR GENERATING LIGHT FIELD IMAGES' filed 21 Apr. 2023 which is incorporated in its entirety by this reference, etc.). However, the 3D image can additionally or alternatively be stored as a neural radiance field (NeRF), using a photoset, as a Gaussian splat, and/or in any suitable format.

Examples of processes that the computing system can perform include (but are not limited to): aliasing corrections, mode switching, lenticularization (including single and/or multilenticularization such as in a manner as described in U.S. patent application Ser. No. 18/137,720 titled 'SYSTEM AND METHOD FOR GENERATING LIGHT FIELD IMAGES' filed 21 Apr. 2023 which is incorporated in its entirety by this reference), compression and/or decompression (such as in a manner as described in U.S. patent application Ser. No. 18/137,720 titled 'SYSTEM AND METHOD FOR GENERATING LIGHT FIELD IMAGES' filed 21 Apr. 2023 which is incorporated in its entirety by this reference), adjusting a focal point of a 3D image (e.g., in a manner as described in U.S. patent Ser. No. 11/849,102 titled 'SYSTEM AND METHOD FOR PROCESSING THREE DIMENSIONAL IMAGES' filed 3 Jun. 2022 which is incorporated in its entirety by this reference), image interaction, image occlusion, image selection, device calibration (e.g., lenticular calibration such as pitch, angle or slope, center, change in lenticule pitch, change in lenticule center, change in lenticule slope and/or angle, tilt, pixel and/or subpixel arrangement, etc.; interscreen calibration such as alignment or overlap between a first screen and second screen; etc.), and/or other suitable processes.

Aliasing corrections can be particularly beneficial for the display of two-dimensional content (e.g., text, corners, planar shapes, images within images, etc.) within a 3D image. Two-dimensional content within a 3D image (particularly for lens array, lenticular array, or parallax barrier displays) can appear nonoptimal because 1) the resolution of a single view is less than a resolution of a base screen (as the lenticular displays channels in different directions) and because 2) lenticular-based and/or lens-array-based 3D displays magnify the underlying pixels (e.g., filling the width of a lenticule or the area of a lenslet) resulting in a sampling process where the underlying content is represented in an all-or-nothing manner. In the case of situation 2), most of the pixels from the screen will be invisible to the viewer from a viewpoint, particularly when the view count of such 3D displays is high resulting in the represented content (the content being shown over a lenticular or a lens array) to appear broken and piecewise. However, two-dimensional content can otherwise be non-optimally displayed in a 3D image. Related visual defects can additionally or alternatively result from a separation of colors, because RGB components that form a virtual pixel are not always selected from the same pixel in the base image in signal space. These aliasing corrections to 2D images and/or 2D content within a 3D image can be displayed concurrently with 3D information, can be time-multiplexed between 2D and 3D information, and/or can otherwise be applied.

Figure 12:
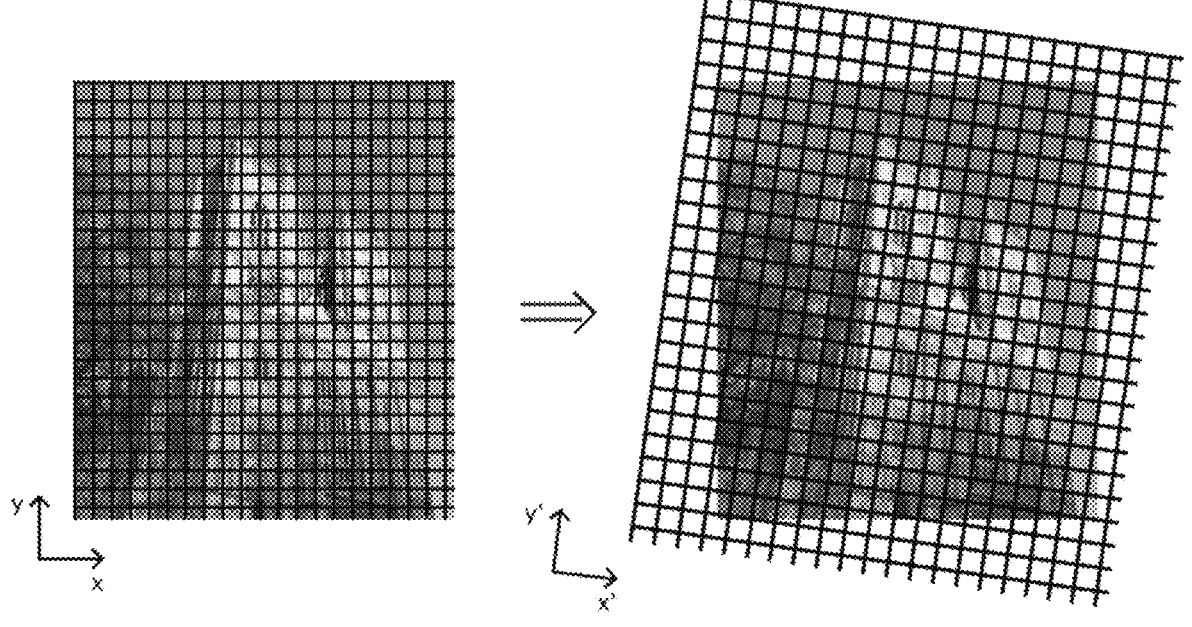
FIG. 12 is a schematic representation of an exemplary aliasing correction applied to an image or view.

In a first variant, aliasing corrections (inclusive of separation of color correction) can be performed by adjusting the quilt image (or other representation of the 3D image) based on the tilt of the lenticular array and/or lens array (e.g., by resampling the quilt image). In a second variant (as shown for example in FIG. 12), aliasing corrections (inclusive of separation of color correction) can be performed by transforming individual views (with the appropriate anti-aliasing technique applied) within a quilt image (e.g., each view) to form a tilted intermediate image to be sampled from and determine the brightness of the subpixels that contribute to a virtual pixel (where the virtual pixel depends on the 3D screen calibration). In either or both of these variants, a resolution of the quilt image and/or individual views thereof is preferably higher than a resolution of a display outputting the views (e.g., so that the sampling does not result in a significant loss of info). In either or both of these variants, a pixel in the rotated sampling grid corresponds to a virtual pixel on the lenticularized screen (e.g., the resolution, orientation, and/or virtual pixel aspect of the grid depend on the calibration of the parallax barrier). In some examples of the first or second variants, the same tilted grid can be used for all views in a quilt. In other examples, a different tilted grid can be used for each view (and/or a subset of views) as there can be a shift in the location of a virtual pixel along y' (as shown in FIG. 12). In a third variant aliasing corrections (inclusive of separation of color correction) can be performed by leveraging pixel and/or sub-pixel averaging. As a first example of the third variant, a virtual pixel on the low-resolution image (e.g., a view) can have a color formed from an average of the pixels it covers. As a second example of the third variant, temporal averaging (e.g., combining past frames with current frames such as leveraging temporal anti-aliasing) can be used (optionally including jitter). As a fourth variant, the quilt image can be generated (and/or modified) such that the views of the quilt image are captured and/or generated on a tilt (e.g., using virtual cameras at the resolution of the virtual pixel with a tilt determined based on a device calibration). The fourth variant can be particularly, but not exclusively, beneficial for real- or near-real time image display on a targeted display device (as the tilt and/or pitch unique to a display device) as this variant can skip intermediate steps of generating a quilt image and resampling the quilt image (i.e., directly generates a quilt image with the desired tilt and/or pixel resolution). As a fifth variant, an image or subset of an image can be jittered or wiggled (e.g., in a direction parallel to a view separation direction). As a sixth variant, a combination of resampling, averaging, and/or other variants can be used (e.g., any combination of one or more of the preceding variants from this paragraph). However, anti-aliasing can otherwise be performed.

In variants that leverage resampling (e.g., the first, second, or fifth variants above or other related variations), the lenticular tilt is often excluded for simplicity (referred to as orthogonal sampling). However, more accurately, the original image on the base image can have an angle from the sampling direction of the lenticular; therefore, further improvements can be realized by leveraging a non-orthogonal sampling.

During corrections for aliasing, which subpixel (from the screen) is associated with which view can be determined based on the lenticularization of the quilt image, the formation of the quilt image, derived from the calibration, and/or can otherwise be determined.

During corrections for aliasing, which subpixel (from the screen) is associated with which virtual pixel in the quilt image (or other representation of the 3D image) can be determined from the physical location of the subpixels and the calibration. For example, a height of a virtual pixel along y' can be determined from the screen pitch and tilt of the parallax generator's coordinate system relative to the screen pitch (for one illustrative example according to $y'=P_{screen}/tilt$ where y' is a height along axis y' from FIG. 12, $P_{screen}$ is the screen pixel pitch, and tilt is a tilt of the sampling grid; however for some displays other equations may be needed) and a width of a virtual pixel along x' can be determined from the screen pitch (for one illustrative example according to x'=pitch where x' is a width of the pixel along axis x' and pitch is a lenticular pitch). Taken together, the relative position between the sampling grid (i.e., the virtual pixel grid on the lenticular) and the base screen can be defined by understanding which subpixel goes to the center view using the calibration (e.g., of the parallax barrier).

These relationships accounting for aliasing can result in a preferred number of views (e.g., minimum number of views, maximum number of views without reducing resolution of the views, etc. based on the resolution of the screen and the size of the virtual pixels). However, in some variants, this preferred number of views can be exceeded (which can be beneficial for improving depth perception and/or accessible depth). As a first example of a technique for exceeding the preferred number of views, the virtual pixels and/or virtual sub-pixels can be redistributed (e.g., to the closest view). In a first variation, the center of a virtual pixel can be treated as the smallest unit and the whole virtual pixel can be assigned to the closest view. In a second variation, the center of a sub-virtual pixel can be treated as the smallest unit and the sub-virtual pixel can be assigned to the closest view. In some implementations (particularly of the second variation), the color of a sub-virtual pixel can be colored by the weighted average of the views the sub-virtual pixel is sandwiched between. As a second example of a technique for exceeding the preferred number of views can include an optimization problem where based on how the light of each subpixel spreads in space, the color of each subpixel can be optimized so that the output light has the lowest error terms compared to the end goal (e.g., most accurately outputs the desired image given the resolution of the view). This second example may additionally or alternatively be beneficial for algorithmic improvements to crosstalk. In a specific implementation of the second example, the signal provided to the screen can be adjusted to minimize the perceived discrepancy between what is intended to be shown and what is actually shown and/or perceived. In this specific implementation, the subpixels that belong to a view do not display the signal for the corresponding view, but rather display something such that the overall resulting output light gives the best outcome (e.g., after the weighted summation overall all pixels and/or subpixels). However, other implementations can exist to achieve similar results.

While these improvements for aliasing (inclusive of color separation) are particularly beneficial for two-dimensional content to be presented by a 3D screen, the improvements can also be realized and/or performed for three-dimensional content to be presented by a 3D screen and/or for two-dimensional content to be presented by a 2D screen. In some variants, the improvements can be performed for a subset of views within a quilt image (e.g., views that are further off-axis).

In some variants (particularly in modes or situations where only one of 2D or 3D images is presented or modes or situations where the majority of the 2D and 3D images are not overlapping), light output from different screens can be leveraged to increase an optical quality (e.g., resolution, brightness) of other screens. For example, light output from a 3D screen can be used to improve a resolution of a 2D image output by a 2D screen. As an exemplary implementation, any of the above techniques applied for antialiasing can be applied between two (or more) screens. As another exemplary implementation, a position of light output from a first screen can have a known spatial distribution relative to light from a second screen (e.g., based on the relative screen calibration) and can be used to provide additional light for the image on the second screen in those regions or areas (e.g., by providing the image to be displayed on the second screen to the first screen with a transformation based on the spatial distribution of the output light). Tracking of the viewer(s) is preferably, but not necessarily, beneficial for implementations where one screen is used to enhance another (particularly when a 3D screen does not provide full parallax).

In variants that include occlusion effects, 2D content is preferably used to occlude 3D content (e.g., a 2D image is used to occlude portions or all of a 3D image such as views of the 3D image, regions of the 3D image, etc.). For instance, occlusion can include determining a region of a first image (e.g., 3D image) to occlude, determining a mapping of the region of the first image to a region of a second image (e.g., on a second screen such as a 2D image) to be occluded, and determining lighting conditions such that the region of the 3D image appears to be occluded by the 2D content (e.g., by not displaying the occluded content on the 3D screen; by setting the pixels corresponding to the occluded content as clear, black, or other suitable color that represents occluded regions; by washing out the image; by activating a liquid crystal element; etc.). However, 3D content can be used to occlude 2D content. For example, to occluding a 2D image or portion thereof with a 3D image or content thereof can include determining a region of the 2D image to occlude, determining a mapping of the region of the 3D image to a region of the 2D image (e.g., on a second screen) to be occluded, and determining lighting conditions such that the region of the 2D image appears to be occluded by the 3D content (e.g., by not displaying the occluded content on the 2D screen; by setting the pixels corresponding to the occluded region as clear, black, or other suitable colors that represents occluded regions; by washing out the image; by activating a liquid crystal element; etc.). However, occlusion can otherwise be achieved.

In variants that include subset holographic rendering, a subset of a 3D image can be rendered. For instance, the hologram can only be rendered to a part of a 3D screen rather than all of it. Additionally, or alternatively, only a subset of views of a 3D image can be rendered or provided to a 3D screen. Similarly, these subsets can be used in addition to or as an alternative to occlusion of regions (e.g., by excluding some regions of the 3D image from being rendered or provided and thus not being output by the device).

In some variants, a 2D image can be used to highlight or enhance a 3D image. For instance, a 2D window (e.g., output by a 2D screen such as a box or ring of light) can surround a hologram (e.g., 3D image) where the 2D window can "contain" the holographic content. In these variants, the location of the 2D window can be determined based on the calibration of the screens to one another which can be used to determine where the 3D image passes through the 2D screen (which can then be used to determine where the window should be to surround the 3D image). In some variations of these variants, tracking of the viewer(s) can be used to facilitate implementations where tight alignment of the screens (e.g., alignment of the 2D window to the 3D content) are desired (e.g., particularly but not exclusively when the 3D screen does not provide full parallax).

However, the 2D image(s) and 3D image(s) can otherwise interact or be modified in combination with or isolation from one another. While reference is typically made to 2D images and 3D images, similar techniques also apply to devices that are arranged with a plurality of 3D screens and/or plurality of 2D screens.

A user interface for performing these operations can include one or more of the following windows, tabs, active areas, and/or other viewing methods: a main display area (e.g., with a 2D display section occupying one half or other portion of the screen or computer display, displaying traditional 2D content such as windows, menus, applications, etc. a 3D display section occupying another half or other portion of the screen or computer display, overlaying or complementing the 2D display section with 3D holographic content; where the 2D display section and 3D display section can optional overlap one another, in which case some of the above mechanisms to avoid visual conflict between the 2D and 3D content can be employed for a comfortable viewing experience), a calibration UI (e.g., including a calibration grid such as a semi-transparent grid overlay that assists users in aligning the 2D and 3D displays, where users can adjust the grid to ensure accurate alignment; calibration tools such as buttons and sliders to fine-tune the alignment, with real-time feedback on the calibration status; etc.), occlusion management panel (e.g., a floating panel on screen or computer display with sliders, buttons, etc. to manage how 2D elements occlude 3D content; where users can adjust the opacity, position, priority, etc. of 2D elements); subset holographic rendering control (e.g., a floating toolbar at the top of the screen or computer display for defining and managing rendering zones; users can draw or select zones using a cursor, and the toolbar can provide tools to create, modify, delete, etc. these zones), a hologram window frame (e.g., a resizable window within the main display area containing 3D content where users can resize, move, and interact with this window like a traditional 2D window), settings and customization (e.g., accessible from a menu icon, providing options to adjust display settings such as brightness, contrast, color, etc. and/or customize the UI such as themes, shortcuts, toolbars, etc.). However, the user interface can additionally or alternatively include other suitable windows, toolbars, applications and/or other interfacing components.

In some variants, the device can include an interaction tool (e.g., a physical interaction tool), which can be used by viewer(s) to interact with (e.g., in a manner as described above, interface with the user interface or image controls, etc.) the images output by the device. Examples of interaction tools include: a mouse, a capacitive touch sensor, gesture sensors, tracking sensors, wired gloves or other clothing, depth camera, stereo cameras, gesture-based controllers, Wi-Fi sensing, monocular camera, pen, and/or other suitable interaction tool(s).

4. Specific Examples

For example, a lightfield display (e.g., including a screen, parallax generator, flip controller, etc.) can include a transparent screen (e.g., transparent LCD, transparent LED, transparent OLED, passive transparent display, transparent color LCD, transparent monochrome LCD, micro-LED, spinning LED fan, transparent projection screen, holographic optical element (HOE), waveguide, etc.), where the lightfield display can present a three-dimensional image and the transparent screen can present a two-dimensional image (e.g., overlaid on, extending into, behind, etc.) the three-dimensional image. In variations of this example, the transparent screen can function as a volumetric guide, define an optical volume (e.g., define a volume between the screen and the transparent screen), and/or can otherwise function to facilitate the perception of the three-dimensional image as three-dimensional. The transparent screen can be in contact with the lightfield display (e.g., a frame of the lightfield display, an optical volume of the lightfield display, etc.), offset from the lightfield display (e.g., by a predetermined distance such as 1 mm, 5 mm, 1 cm, 5 cm, 10 cm, 50 cm, etc.), and/or can otherwise be arranged relative to the lightfield display.

Some variations of the transparent display (e.g., transparent monochrome LED) can leverage and/or operate by (e.g., operate in different modes) cycling through 3D and RGB phases to reconstruct color on the transparent display (e.g., can operate in simple color cycle, complex color cycle, monochrome, etc. modes), where the time allocated to different phases can be adjusted to change the relative brightness of the layers. Some variations of the transparent display (e.g., transparent OLED, micro-LED, spinning LED fan, etc.) can be beneficial as no backlight is needed and can result in a brighter system (however, this may introduce and/or require a static or dynamic darkening surface between the transparent layer and the 3D layer for enhanced contrast). Some variations of the transparent display (e.g., transparent projection screen, HOE, waveguide, etc.) can be beneficial as no backlight is needed (however, a dimming surface may be needed between the 2D and 3D layers for better contrast and different separations may be needed for different technologies, different viewing distances, different applications, etc.).

In some variants of the apparatus, the per-view resolution can be improved using a transparent screen overlaying method. In these variants, 2D contents that require a higher resolution density than that on the 3D screen can be moved to the transparent display layer so that they do not suffer from the potential resolution hit of the 3D display. While preliminarily designed to be used in 3D displays to be viewed from a distance, the same idea can also be used in near-eye 3D displays in AR/VR/MR/XR domains and/or other suitable 3D displays.

Figure 5:
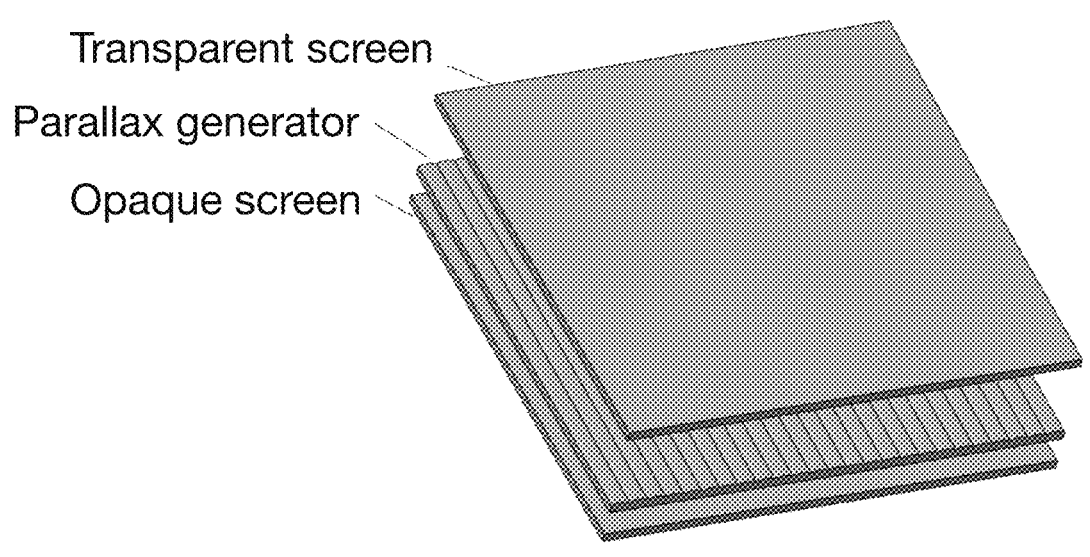
FIG. 5 is a schematic representation of an example of the apparatus. In this example, the base LCD and lenticular can form a 3D display.
Figure 6:
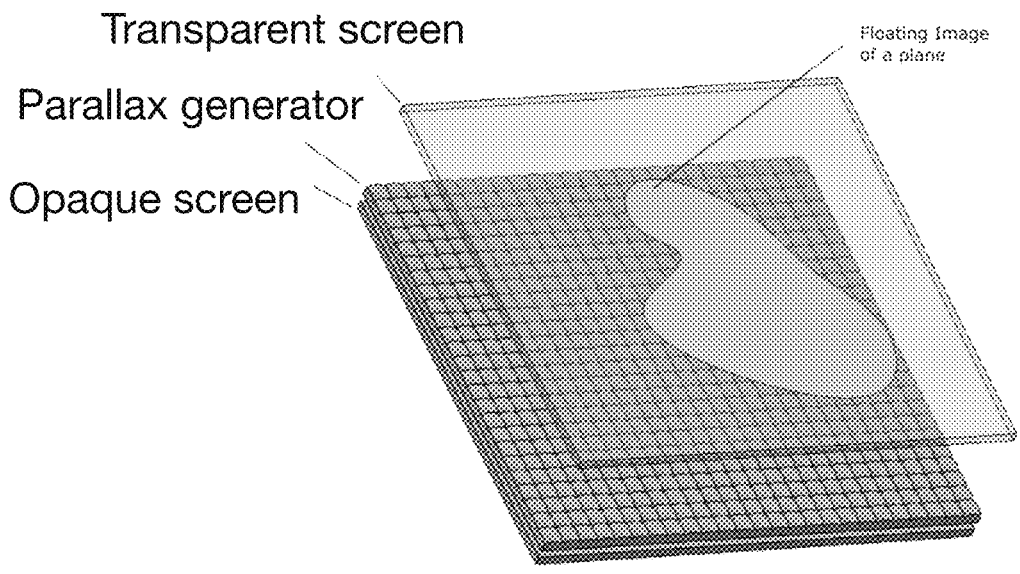
FIG. 6 is a schematic representation of an example of the apparatus. In this example, the floating image of a plane can serve as a backlight for the transparent screen.

As a specific example (as shown for instance in FIG. 5), an apparatus can include a color LCD panel (e.g., two polarizers and two glass substrates sandwiching the liquid crystal, electronics, and RGB color filters) on top of a base 3D display module (e.g., including, for instance, an LCD module, such as an LCD panel with a backlight unit, and a lenticular). However, the bottom polarizer of the transparent LCD screen can optionally be omitted (e.g., when light coming off the underneath screen(s) is sufficiently polarized). In this construction, the LCD panel can form a transparent 2D layer on top of the 3D display that forms the 3D layer. In this specific example, the color LCD panel is expected to be placed on top of the 3D display layer at a certain separation (e.g., 5 mm, 1 cm, 2 cm, 5 cm, 10 cm, 20 cm, 25 cm, 50 cm, 100 cm, etc.). However, the transparent layer can touch (e.g., be in contact with) the 3D display layer. The separation may be filled with air or other material (e.g., glass, polymer, etc. such as chosen based on an index of refraction, transparency, opacity, etc. of the material) depending on the system's expected performance. Since the top LCD screen is unable to produce its own light in this construction, regions with 2D content on top of the 3D layer shall remain bright on the 3D layer to serve as the backlight of the color LCD panel. Variations of this specific examples can maintain an alignment of the regions on the two layers upon varying relative positions between the viewer and the assembly, by using a small separation between the two layers (e.g., less than about 10 cm). In other variations, the alignment can be maintained (e.g., in spite of a large separation) by projecting a 3D image of the required backlight at the corresponding depth of the 2D layer, as illustrated in FIG. 6. In other variations (that can be combined with or separate from the preceding variations), a tracking device can optionally be used (e.g., when the 3D screen does not provide full parallax) to maintain the alignment. However, any suitable separation can be used and/or the alignment can be maintained in any manner. In variations of this specific example, transmissive displays other than a color LCD can also be used (e.g., a transmissive type interferometric modulator display).

As a first specific variation of the specific example, a monochrome LCD can be used in place of the color LCD. The monochrome LCD can provide an advantage as the lack of the color filter can allows a greater transmittance than a color LCD and the larger size of a pixel on a monochrome LCD at the same resolution also gives a smaller diffractive when transmitting light from the 3D layer, retaining more of the integrity of the light field from the underlying 3D scene. This specific variation can operate in different modes (such as a simple color mode, complex color mode, monochrome mode, HDR mode, etc.). Note that these modes (particularly but not exclusively HDR mode) can be used with any suitable transparent display and are not limited to only monochrome transparent displays.

As an example of a simple color mode, when color content is expected on the 2D layer, the base 3D layer can cycle through 4 phases in one complete frame following a temporal multiplexing idea. When the base screen is in operating in RGB mode, the 4 phases can be 3D content, red, green, and blue. During the 3D content phase, the base 3D layer shows the intended 3D content and the 2D layer is at its fully transmissive status all over its whole area. At the red/green/blue phase, the base 3D layer at full red/green/blue, and the 2D layer is transmissive only at the pixels that would light up at the corresponding color for the intended fraction of time to create the intended color content on the 2D layer. The relative proportion of time allocated to the 4 phases can be varied to alter the relative brightness between the 3D phase and the RGB phase. This can be useful to adjust the relative brightness of the 3D and 2D content. In a more extreme case, software effort may also be implemented to reduce the color depth of the 2D layer by means of limiting the ON-time of the RGB phases. This in turn can allocate more time to the 3D content phase and achieves brighter 3D content.

In variations of the color mode (e.g., in a complex color mode), the color cycle can be made more complex to boost the efficiency in the usage of light by maximizing the ON-time of the 2D layer. This can be done in multiple ways. One way to do so is to vary the relative duration of the RGB phases according to the maximum brightness of a color. For example, if the brightest red on the 2D layer is 200 out of 255 while the brightest green and blue are at 255 out of 255, then the ON-time allocated to the red phase can be reduced relative to that for the other phases. This way, the ON-time can be distributed to other phases for a more efficient resource allocation. Another way is to mix the RGB color cycle phases together. This is only possible when the base screen doesn't have to change its color uniformly over its whole area. For example, suppose a region on the 2D layer calls for (200, 255, 255) in RGB while another calls for (255, 200, 255), the 3D layer corresponding to the former region can allocate less time for R only in the former region and do the same for G for the later region, as opposed to allocating the same amount of time to all 3 colors and use the 2D layer to cut out ON-time that is not required. In simpler terms, the goal is the maximization of the 2D layer's ON-time as long as possible. The increased brightness may not be worth the effort due to: the content-dependent fluctuation in the overall brightness the additional computation effort. However, it may be worthwhile considering the practical use case where the 2D layer is only supportive of the 3D layer and may not be required to display very vivid content.

In examples of the monochrome mode, under such a condition, it is possible to keep the monochrome 2D layer monochromatic (e.g., when the 2D image includes letters, numbers, or other content that is informational or does not need a full range of colors). In this mode, the RGB phase (from the simple and/or complex color mode) can be merged into one single phase. The 3D content can be made brighter since more time is allocated to the 3D content phase.

In examples of the high dynamic range (HDR) mode (e.g., for a 2D screen that does not use a backlight such as a transparent OLED), in the case where a separation exists between the 3D layer and 2D layer, the region to be lit up can be formed by a floating plane that coincides with the region intended to be lit up on the 2D layer (as shown for instance in FIG. 6).

In a second variation of the specific example, the color LED can be replaced with a transparent OLED screen, a transparent micro-LED screen, spinning LED-on-fan-blade displays, or other transparent light-emitting surfaces. As opposed to transmissive screens, such light-emitting screens do not require a light source from behind and can operate relatively independently of the 3D layer. The ON-time of the 3D layer can 100% be contributed to the display of 3D content since it doesn't have to serve as a backlight for the 2D layer as in the case where the transmissive 2D layer is subtractive in nature. A darkening layer can optionally be added between the 3D and 2D layers to further boost the contrast of the 2D layer. Such a layer can be static (e.g.: a tinted plastic film or the equivalent) or dynamic (e.g.: a transmissive LCD, a film that darkens depending on the applied voltage, or the equivalent) in nature.

In a third variation of this specific example, Surfaces that are mostly transparent but can reflect/diffuse light off of their surfaces can also serve as the 2D layer (e.g., instead of or in addition to a color LED or other transparent screen). For example, a waveguide, holographic optical element (HOE), transparent projection surface, a voltage-controlled privacy surface oscillating between transparent and opaque mode, a transparent film infused with photoluminescent material like a phosphor or quantum dot, a layer of water mist, and/or any suitable scattering surface can be a suitable medium for the 2D layer. A number of projection units are also expected to project/induce the formation of 2D images on the 2D layer. In the cases where light is projected directly onto the reflective/diffusive surface, the 2D and 3D layers are preferred separate from each other by a distance so as to give way for the projected light before/after it reaches the 2D layer. In the case where a waveguide is used as the 2D layer, the projection light can travels within the waveguide itself. The separation between the 2D and 3D layers can be significantly reduced if the design calls for a more compact footprint. When a HOE is used as the 2D layer, multiple layers of HOE might be used in a stacked form to interact with projection light at different colors. Multiple projection units at multiple locations may also be used to accommodate the color/projection angle requirements from the HOE design. An optional darkening layer can also be applied between the 2D and 3D layers to increase the contrast of the 2D layer.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30%, etc. of a reference), or be otherwise interpreted.

The methods of the preferred embodiment and variations thereof can be embodied and/or implemented at least in part as a machine configured to receive a computer-readable medium storing computer-readable instructions. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A device comprising:
a first light source that generates a first light output;
a parallax generator that receives the first light output and transmits separate portions of the first light output into distinct directions; and
a second light source that generates a second light output, wherein the separate portions of the first light output are transmitted through the second light source, wherein a distance between the first light source and the second light source is less than a distance between the first light source and a maximum 3D depth defined by the parallax generator in combination with the first light source and, wherein the distance is between 3 and 10 cm.

2. The device of claim 1, wherein a number of distinct directions is at least 20.

3. The device of claim 1, wherein the first light source comprises one of: light emitting diode, organic light emitting diode, quantum dot light emitting diode, micro light emitting diode, or liquid crystal display.

4. The device of claim 3, wherein the second light source comprises one of: transparent light emitting diode, transparent microlight emitting diode, transparent organic light emitting diode, transparent liquid crystal display, spinning fan display, or an electroluminescent display.

5. The device of claim 1, wherein the parallax generator comprises a lenticular array.

6. The device of claim 1, wherein the first light source comprises one of: transparent light emitting diode, transparent microlight emitting diode, transparent organic light emitting diode, transparent liquid crystal display, or an electroluminescent display.

7. The device of claim 6, wherein the parallax generator comprises a transparent sheet comprising a lenticule only overlaying each light generating element of the first light source.

8. The device of claim 1, further comprising a diffuser arranged between the parallax generator and the second light source.

9. The device of claim 8, wherein the diffuser comprises a diffusing angle between 0.1 and 2°.

10. The device of claim 1, further comprising a processor configured to:

receive a three-dimensional image;

map the three-dimensional image to pixels of the first light source based on a calibration of the device;

provide the mapped three-dimensional image to the first light source, wherein the first light output comprises the mapped three-dimensional image.

11. The device of claim 10, wherein the processor is further configured to determine a two-dimensional image, wherein the two-dimensional image is provided to the second light source.

12. The device of claim 11, wherein determining the two-dimensional image comprises based on the three-dimensional image, determining elements of the second light source to occlude regions of the first light output.

13. The device of claim 11, wherein determining the two-dimensional image comprises, based on the three-dimensional image, identifying pixels of the second light source to activate to form a two-dimensional optical window around the three-dimensional image.

14. The device of claim 13, wherein the two-dimensional optical window enhances a perception of depth of the three-dimensional image.

15. The device of claim 10, wherein mapping the three-dimensional image to the pixels comprises mapping the three-dimensional image to only a portion of the first light source.

16. The device of claim 1, further comprising a processor configured to receive a two-dimensional image;

determines a spatial distribution of the first light output relative to the second light source; and generate a second image operable to improve a resolution of the two-dimensional image, wherein the processor provides the two-dimensional image to the second light source and the second image to the first light source.

17. The device of claim 1, further comprising a user interaction device, wherein the user interaction device can operate in a 2D image interaction mode and a 3D image interaction mode.

18. The device of claim 17, wherein the user interaction device comprises an imaging system configured to detect gestures from one or more viewer of the device.

19. A device comprising:

a first light source that generates a first light output;

a parallax generator that receives the first light output and transmits separate portions of the first light output into distinct directions;

a second light source that generates a second light output, wherein the separate portions of the first light output are transmitted through the second light source; and wherein a distance between the first light source and the second light source is less than a distance between the first light source and a maximum 3D depth defined by the parallax generator in combination with the first light source and, wherein the distance is between 3 cm and 10 cm; and a processor configured to:

receive a three-dimensional image;

determine a two-dimensional image, wherein the two-dimensional image is provided to the second light source;

determining elements of the second light source to occlude regions of the first light output based on the three-dimensional image;

apply anti-aliasing transformations to the three-dimensional image;

map the three-dimensional image to pixels of the first light source based on a calibration of the device; and provide the mapped three-dimensional image to the light source, wherein the first light output comprises the mapped three-dimensional image.

20. The device of claim 19, wherein the three-dimensional image is formatted as a quilt image, wherein the anti-aliasing transformations comprise adjusting the quilt image based on a tilt of the parallax generator.

21. The device of claim 19, wherein the parallax generator comprises a lenticular array.

22. The device of claim 19, wherein the first light source comprises one of: transparent light emitting diode, transparent microlight emitting diode, transparent organic light emitting diode, transparent liquid crystal display, or an electroluminescent display.

23. The device of claim 22, wherein the parallax generator comprises a transparent sheet comprising a lenticule only overlaying each light generating element of the first light source.

* * * * *